(12) United States Patent
Hwang et al.

(10) Patent No.: US 11,832,153 B2
(45) Date of Patent: Nov. 28, 2023

(54) METHODS AND APPARATUS FOR V2X COMMUNICATION USING AN INTER V2X FREQUENCY

(71) Applicant: Samsung Electronics Co., Ltd., Suwon-si (KR)

(72) Inventors: June Hwang, Incheon (KR); Hyunjeong Kang, Seoul (KR); Sangwook Kwon, Suwon-si (KR); Youngjoong Mok, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 892 days.

(21) Appl. No.: 16/475,915

(22) PCT Filed: Jan. 3, 2018

(86) PCT No.: PCT/KR2018/000095
§ 371 (c)(1),
(2) Date: Jul. 3, 2019

(87) PCT Pub. No.: WO2018/128372
PCT Pub. Date: Jul. 12, 2018

(65) Prior Publication Data
US 2019/0357025 A1    Nov. 21, 2019

(30) Foreign Application Priority Data

Jan. 3, 2017  (KR) .................. 10-2017-0000955
Feb. 2, 2017  (KR) .................. 10-2017-0015196
Mar. 22, 2017 (KR) .................. 10-2017-0036009

(51) Int. Cl.
H04W 4/40      (2018.01)
H04L 5/00      (2006.01)
(Continued)

(52) U.S. Cl.
CPC ............... *H04W 4/40* (2018.02); *H04L 5/001* (2013.01); *H04W 4/025* (2013.01); *H04W 8/24* (2013.01);
(Continued)

(58) Field of Classification Search
CPC ....... H04W 4/40; H04W 4/025; H04W 72/02; H04W 72/0453; H04W 84/042;
(Continued)

(56) References Cited

U.S. PATENT DOCUMENTS

2005/0250564 A1  11/2005  Kishigami et al.
2016/0135244 A1   5/2016  Chen
(Continued)

FOREIGN PATENT DOCUMENTS

CN        1675854 A     9/2005
CN      106060947 A    10/2016
(Continued)

OTHER PUBLICATIONS

Huawei et al., "Further Analysis of Inter-carrier Operation on PC5 based V2X", R2-167931, 3GPP TSG RAN WG2 Meeting #96; Nov. 5, 2016; Reno, USA.
(Continued)

*Primary Examiner* — Omar J Ghowrwal
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. The disclosure presents a method and a device allowing a system and a terminal to perform vehicle to everything (V2X) communication by using multiple carriers in a V2X wireless communication system and, particularly, the method of the terminal in the communication system comprises the steps of: receiving, from a base station, system information including a plurality of pieces of V2X carrier information and frequency and pool information of each of a plurality of V2X carriers; and transmitting, to the base station, sidelink user equipment (UE) information including a plurality of pieces of interest V2X carrier information on the basis of the system information.

18 Claims, 23 Drawing Sheets

(51) Int. Cl.
| | |
|---|---|
| H04W 4/02 | (2018.01) |
| H04W 72/02 | (2009.01) |
| H04W 8/24 | (2009.01) |
| H04W 48/12 | (2009.01) |
| H04W 72/0453 | (2023.01) |
| H04W 72/23 | (2023.01) |
| H04W 72/20 | (2023.01) |
| H04W 84/04 | (2009.01) |
| H04W 72/51 | (2023.01) |
| H04W 72/0446 | (2023.01) |

(52) U.S. Cl.
CPC .......... *H04W 48/12* (2013.01); *H04W 72/02* (2013.01); *H04W 72/0453* (2013.01); *H04W 72/20* (2023.01); *H04W 72/23* (2023.01); *H04W 72/0446* (2013.01); *H04W 72/51* (2023.01); *H04W 84/042* (2013.01)

(58) Field of Classification Search
CPC ... H04W 8/24; H04W 48/12; H04W 72/0446; H04W 72/048; H04W 72/042; H04W 72/0406; H04W 72/23; H04W 72/51; H04W 72/20; H04L 5/001
See application file for complete search history.

(56) References Cited

U.S. PATENT DOCUMENTS

| | | | |
|---|---|---|---|
| 2016/0330728 A1 | 11/2016 | Sorrentino et al. | |
| 2016/0381666 A1 | 12/2016 | Kim et al. | |
| 2017/0019812 A1 | 1/2017 | Lee et al. | |
| 2017/0230993 A1 | 8/2017 | Lee et al. | |
| 2018/0124707 A1 | 5/2018 | Lee et al. | |
| 2018/0262887 A1* | 9/2018 | Futaki | H04W 76/10 |
| 2018/0359707 A1* | 12/2018 | Chae | H04W 52/383 |
| 2019/0082352 A1* | 3/2019 | Hua | H04W 72/0453 |
| 2019/0268915 A1 | 8/2019 | Li et al. | |

FOREIGN PATENT DOCUMENTS

| | | |
|---|---|---|
| CN | 106063352 A | 10/2016 |
| CN | 106105305 A | 11/2016 |
| CN | 106165516 A | 11/2016 |
| CN | 106211339 A | 12/2016 |
| EP | 3 297 358 A1 | 3/2018 |
| WO | 2016-182295 A1 | 11/2016 |

OTHER PUBLICATIONS

Huawei, "Summary of [94#30][LTE/V2V]-RRC Open issues", R2-164880, 3GPP TSG-RAN WG2 Meeting #95; Aug. 13, 2016; Gothenburg, Sweden.
Ericsson, "Discussion on PC5 Multi-Carrier", R2-168641, 3GPP TSG-RAN WG2 #96; Nov. 5, 2016; Reno, Nevada, USA.
3GPP TS 36.331 vol. 13.3.0, "3GPP; TSGRAN; E-UTRA; RRC; Protocol specification (Release 13)"; Oct. 3, 2016.
Korean Office Action dated Jan. 11, 2021, issued in a counterpart Korean Applicatio No. 10-2017-0036009.
Huawei (rapporteur), R2-164480, Summary of [94#30][LTE/V2V]—RRC Open issues, 3GPP TSG RAN WG2 #95; Aug. 13, 2016.
Catt, R2-168109, Multi-Carrier Operation for Sidelink V2X, 3GPP TSG RAN WG2 #96; Nov. 4, 2016.
Extended European Search Report dated Oct. 22, 2019, issued in a counterpart European application No. 18736520.0—1215/ 3547778.
ZTE: "Discussion on cross carrier resource allocation", 3GPP Draft; R2-168134 Discussion On Cross Carrier Resource Allocation, 3rd Generation Partnership Project (3GPP), Mobile Competence Centre ; 650, Route Des Lucioles ; F-06921 Sophia-Antipolis Cedex ; vol. RAN WG2, No. XP051177822; Nov. 14, 2016-Nov. 18, 2016; Nov. 13, 2016; Reno, USA. Retrieved from the Internet: URL:http://www.3gpp.org/ftp/Meetings_3GPP_SYNC/RAN2/Docs/.
Korean Notice of Allowability dated Apr. 15, 2021, issued in a counterpart Korean Applicatio No. 10-2017-0036009.
LG Electronics Inc.; UE capability for V2X sidelink communication; 3GPP TSG-RAN2 Meeting #95bis; R2-167154; Oct. 10-14, 2016, Kaohsiung, Taiwan.
Catt; Consideration on Cross-carrier Configuration; 3GPP TSG-RAN WG2 Meeting #96; R2-168110; Nov. 14-18, 2016, Reno, USA.
LG Electronics Inc.; UE capability for V2X sidelink communication; 3GPP TSG-RAN2 Meeting #96; R2-168761; Nov. 14-18, 2016, Reno, USA.
Chinese Office Action dated Aug. 23, 2022, issued in a counterpart Chinese Application No. 201880005739.8.

* cited by examiner

METHODS AND APPARATUS FOR V2X COMMUNICATION USING AN INTER V2X FREQUENCY

TECHNICAL FIELD

The disclosure relates to a multicarrier-based vehicle-to-everything (V2X) radio communication method and apparatus of a terminal in a V2X radio communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In line with the development of long term evolution (LTE) and LTE-Advanced (LTE-A) technologies, there is a need of a method and apparatus for facilitating multicarrier-based V2X communication between a system and a terminal.

DISCLOSURE OF INVENTION

Technical Problem

The disclosure provides a method for sharing V2X service carrier information between a terminal and a base station in consideration of a multicarrier-based V2X communication service.

Solution to Problem

According to an embodiment of the disclosure, a method of a terminal in a communication system includes receiving system information including information on multiple vehicle-to-everything (V2X) carriers and information on frequencies and pools corresponding to the multiple V2X carriers from a base station and transmitting sidelink terminal information (sidelink user equipment (UE) information) including information on multiple interest V2X carriers to the base station based on the system information. Preferably, the system information further includes per-carrier reception pool information, and the information on multiple interest V2X carriers indicates multiple interest V2X reception carriers and interest V2X transmission carriers. Preferably, the method further includes transmitting, to the base station, terminal capability information (UE capability information) including information indicating a sidelink carrier capable of being used by the UE for simultaneous transmission, information indicating a sidelink carrier capable of being used by the UE for simultaneous reception, and information indicating whether sidelink carrier communication and communication with the base station are simultaneously supported.

According to another embodiment of the disclosure, a method of a base station in a communication system includes transmitting system information including information on multiple vehicle-to-everything (V2X) carriers and information on frequencies and pools corresponding to the multiple V2X carriers to a terminal and receiving sidelink terminal information (sidelink user equipment (UE) information) including information on multiple interest V2X carriers from the terminal based on the system information.

According to another embodiment of the disclosure, a terminal in a communication system includes a transceiver configured to transmit and receive signals and a controller connected to the transceiver and configured to control the transceiver to receive system information including information on multiple vehicle-to-everything (V2X) carriers and information on frequencies and pools corresponding to the multiple V2X carriers from a base station and transmit sidelink terminal information (sidelink user equipment (UE) information) including information on multiple interest V2X carriers to the base station based on the system information.

According to another embodiment of the disclosure, a base station of a communication system includes a transceiver configured to transmit and receive signals and a controller connected to the transceiver and configured to control the transceiver to transmit system information including information on multiple vehicle-to-everything (V2X) carriers and information on frequencies and pools corresponding to the multiple V2X carriers to a terminal and receive sidelink terminal information (sidelink user equipment (UE) information) including information on multiple interest V2X carriers from the terminal based on the system information.

Advantageous Effects of Invention

The disclosure is advantageous in term of supporting V2X services of multiple operators by managing V2X resources and balancing load efficiently to process the V2X communications services on multiple carriers.

MODE FOR THE INVENTION

Figure 1:
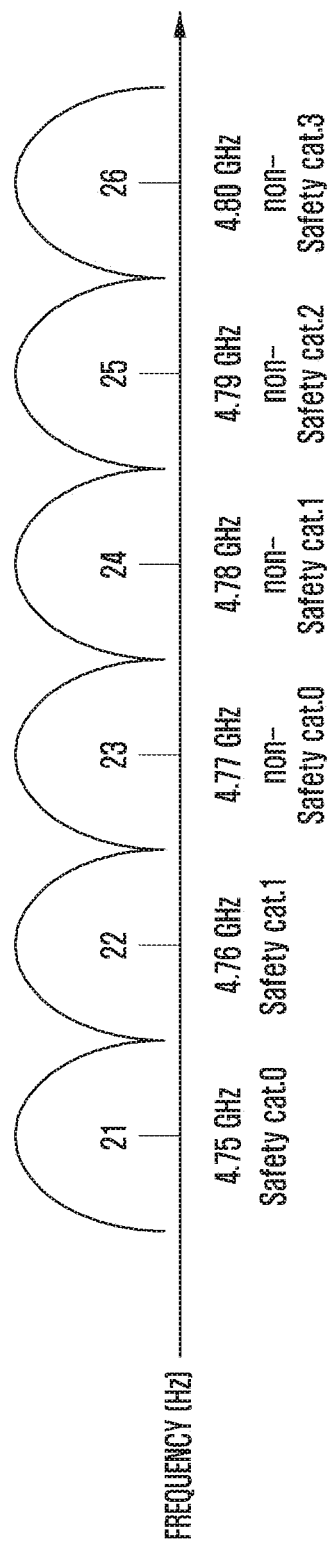
FIGS. 1 to 4 are diagrams illustrating scenarios for an eNB to schedule V2X resources for use by a UE according to various embodiments of the disclosure.

Exemplary embodiments of the disclosure are described in detail with reference to the accompanying drawings.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card. In an embodiment, a module may include one or more processors.

The disclosure encompasses following embodiments.

First, handover (HO) preparation signaling between a source base station (hereinafter interchangeably referred to as source evolved Node B (eNB) or S-eNB) and a target base station (hereinafter interchangeably referred to as target eNB or T-eNB) may include resource information per V2X carrier (hereinafter, interchangeably referred to as frequency or band) which each base station serves, and information on an exceptional pool that can be used by a terminal (hereinafter interchangeably referred to as user equipment (UE)) during a handover to the T-eNB may also be transmitted per carrier.

In the case of supporting multicarrier transmission, V2X carriers may be categorized into V2X safety carrier and V2X non-safety carrier.

If a UE reports one preferred frequency (hereinafter interchangeably referred to as interest frequency or interested frequency) and if it can receive a V2X service on the corresponding frequency after completion of handover, HO command signaling commanding HO to the UE may include exceptional pool resources information without any carrier frequency information in target eNB.

If a UE reports one or more preferred frequencies and if it can receive a V2X service on multiple frequencies after completion of handover, HO command signaling commanding HO to the terminal may include per-frequency exceptional pool resources information.

The exceptional pool included in the handover command signaling for commanding a terminal to perform a handover may be used only for the safety-related purpose. That is, if the handover command signaling includes the exceptional pool and V2X frequency information, the UE may use the exceptional pool for transmitting V2X safety service information. If the UE uses a carrier and resources for the purpose of a V2X safety-related service in an S-eNB, the S-eNB always transmits to the UE a handover command for commanding a handover that includes information on the carrier and exceptional pool for a V2X safety service of the T-eNB in order for the UE to use the carrier and exceptional pool during the handover. The S-eNB transmits V2X non-safety service information, and the UE may use a normal pool in the target eNB.

Second, a V2X system information block (interchangeably referred to as SIB or system information, e.g., SIB21) may provide V2X resource pool information for use by a UE in an idle mode, and the V2X resource pool may be mapped to each V2X carrier and transmitted via the V2X SIB. The V2X resource pool information may differ between a carrier for safety service and a carrier for non-safety service.

Third, RRC dedicated signaling may provide information on a V2X resource pool for use by a UE in a connected mode, and the V2X resource pool may be mapped to each V2X carrier and transmitted via RRC dedicated signaling. The V2X resource pool information may differ between a carrier for safety service and a carrier for non-safety service.

Fourth, a UE may transmit preferred (interest or interested) V2X carrier information to an eNB. In this case, Sidelink UE information may be used by way of example.

Fifth, V2X carrier information may differ between public land mobile networks (PLMNs or operators), and per-operator V2X carrier information may be transmitted to a UE. For this purpose, a broadcast signal or RRC dedicated signaling may be used. In this case, information on at least one of per-operator carrier, transmission pool, or reception pool may be transmitted to the UE.

Sixth, in the case where an eNB and a UE use a V2X cross frequency configuration for a V2X communication service, the UE may measure a channel busy ratio (CBR) on a pool per carrier and transmit a measurement report to the eNB. Signaling the measurement report on the CBR measured by the UE may including V2X frequency information on the pool on which the measurement has been performed.

Seventh, CBR measurement report information associated with a zone configuration-based pool may include V2X frequency information. Zone configuration (i.e., resource information) being transmitted by the eNB may include V2X carrier frequency information.

Eighth, a preconfigured pool in use by a UE out of coverage may be indicated by resource information per V2X carrier. If the UE does not receive an SIB (e.g., SIB21) including V2X communication information (i.e., resource pool information) from an eNB, it may use resource pool information for use by the out-of-coverage UE.

Hereinafter, a description is made of the disclosure with reference to the accompanying drawings.

FIGS. 1 to 4 are diagrams illustrating scenarios for an eNB to schedule V2X resources for use by a UE according to various embodiments of the disclosure.

FIG. 1 is a diagram illustrating frequency bands available for V2X and frequency bands unavailable for V2X with identifiers (IDs). The frequency bands and IDs may vary according to a PLMN and may be specified per country or by an International standardization organization so as to be internationally accepted. A V2X service category may be additionally categorized into this information. That is, frequency bands may be categorized into one of a safety service band and a non-safety service band, and each of the safety and non-safety service bands may be sub-categorized into specific services. Such categorization may be made by a V2X standardization organization, a country, or a PLMN; the category information is delivered to the UE via system information or dedicated signaling from an eNB or preconfigured to the UE.

Figure 2:
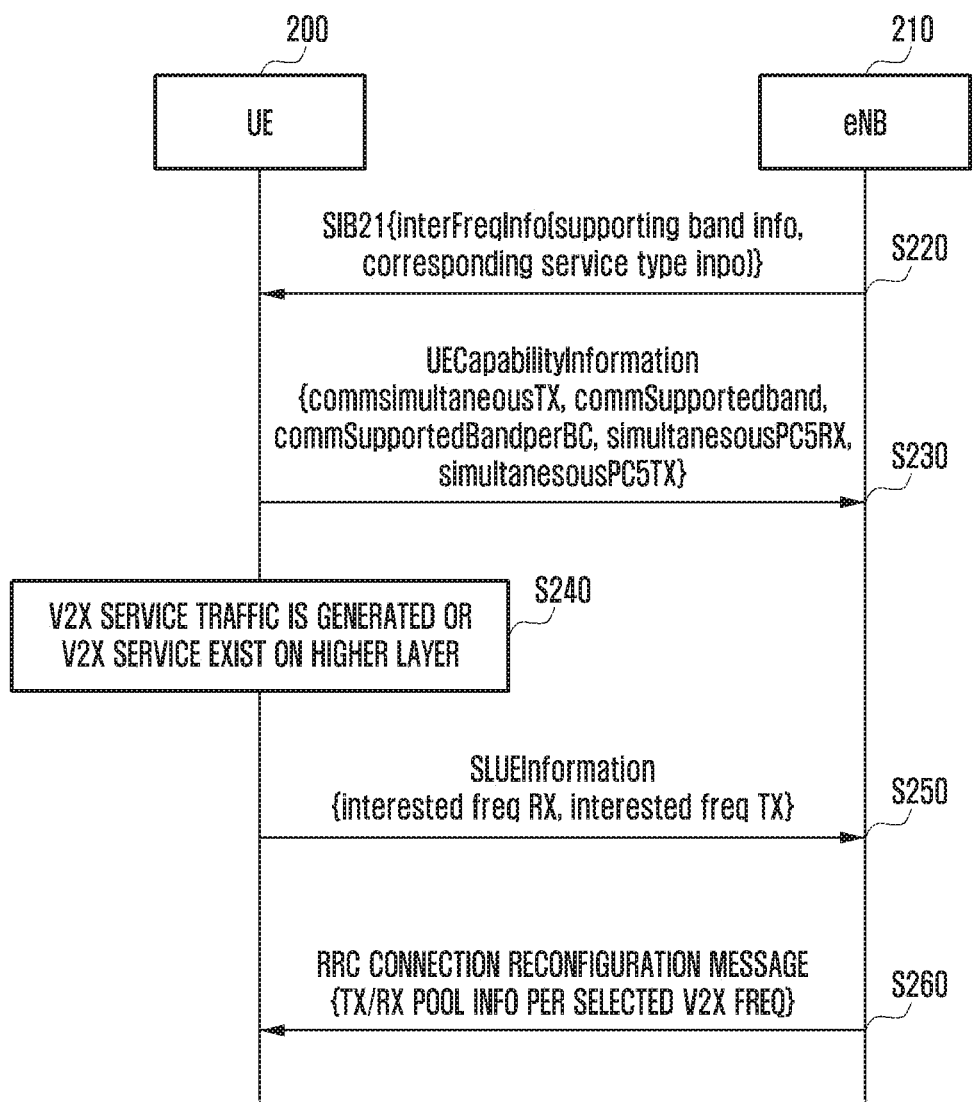

FIG. 2 is a signal flow diagram illustrating a procedure for transmitting a V2X SIB (e.g., SIB21) including information on candidate frequency bands on which an eNB is capable of allocating resources and information on band-specific service type.

An eNB 210 transmits system information to a UE 200 at step S220, the system information including information on a frequency band available for the eNB 201 to allocate resources therein and a service category available in the frequency band among V2X service categories (interFreqInfo (supporting band info, corresponding service type)). As described with reference to FIG. 1, services may be categorized into multiple categories according to an emergency level of a safety-related service, a radio wave propagation range, or whether the corresponding service is a public service or a restricted service (closed service). In an alternative embodiment, the corresponding frequency band and service category information may vary according to country or PLMN. The system information may include a 1-bit indicator for indicating whether the corresponding frequency band is available for safety services or non-safety services.

If the UE 20 establishes an RRC connection with the eNB 210, it may transmit a UECapabilityInformation (UE capability information) message at step S230 to notify the eNB of its capability. In legacy LTE, the UE capability information includes sidelink capability information as follows: 1) commsimultaneousTx, as a Boolean information, indicating simultaneous supportability of Uu transmission (between eNB and UE) and sidelink transmission, 2) commSupportedbands indicating frequency bands supporting sidelink transmission, and 3) commSupportedBandperBC indicating a sidelink frequency band in which a bit string can be received simultaneously through the Uu interface. If the commsimultaneousTx is set up, this also means that simultaneous transmission is possible. If commSupportedBandperBC is set to {100101001}, the first bit represents the first entry of commSupportedbands and its value (i.e., 0 or 1) indicates whether a simultaneous reception (or transmission) is possible or impossible.

Because multiple receptions or transmissions chains for V2X can be accommodated, the disclosure proposes a method for transmitting information indicating supportability of multiple frequency bands via UECapabilityInformation in addition to the above information. For example, assuming two bands available for simultaneous transmission through a PC5 (i.e., sidelink) interface and supportability of bands 21, 22, 23, and 25, the available combinations between two bands may be expressed by a 4-by-4 (4×4) binary matrix. As the number of simultaneously available bands increases to 3, 4, . . . , the dimension of the binary matrix also increases to 3, 4, . . . proportionally. The 4×4 binary matrix may be expressed as shown in Table 1.

TABLE 1

| 1 | 0 | 1 | 1 |
|---|---|---|---|
| 0 | 0 | 0 | 1 |
| 1 | 0 | 1 | 0 |
| 1 | 1 | 0 | 1 |

In this matrix, the diagonal elements (1,1), (2,2), (3,3), and (4,4) represent same-band pairs and thus are ignored, and each of the remaining binary elements is set to 1 to indicate the possibility of simultaneous transmission and 0 to indicate the impossibility of simultaneous transmission. If the element (2,1) is set to 0, this means that the bands 22 and 21 cannot be used simultaneously. If the dimension of the matrix increases, multiple 4×4 binary matrices may be indexed and notified to the eNB.

It may also be possible to combine simultaneously available bands by two and indicate the combinations. For example, if the simultaneously available band combinations are expressed as {(21, 22), (23, 25)}, this may mean that bands 21 and 22 are simultaneously used for transmission/reception and bands 23 and 25 are simultaneously used for transmission/reception. This also means that the bands (21, 22) and (23, 25) cannot be used simultaneously. This method is capable of implicitly indicating the number of reception chains and neighboring bands that can be included in one reception chain.

This method is represented by simultaneousPC5RX and simultaneousPC5TX of UECapabilityInformation in FIG. 2. The simultaneousPC5RX indicates frequency bands that are simultaneously for use by a UE on the sidelink for V2X. This may indicate available band combinations in consideration of the reception chains; for example, if the above information includes {(21, 22), (22, 23), (23, 24), (24, 25)}, the UE may perform simultaneous reception in bands 21 and 22 or bands 22 and 23. Likewise, simultaneousPC5TX may also indicate combinations of V2X frequency bands available for simultaneous transmission.

The UEcapabilityInformation message may also indicate a simultaneous operability between the simultaneously operable band combinations and a serving frequency of the current Uu interface based on aforementioned simultaneous sidelink frequency band and simultaneously-receivable sidelink frequency band information. For example, if the simultaneously available band combinations are {(21,22), (23,25)}, whether the Uu frequency is capable of being simultaneously used with the band combination (21, 22) for transmission/reception or with the band combination (23,25) may be indicated.

Whether a band combination is capable of being simultaneously used with the Uu frequency may be indicated as follows. For example, whether the corresponding band pair is capable of being simultaneously used (received) with the Uu frequency may be indicated by setting a bit to 1 or 0 in consideration of the order of the simultaneously available band pairs transmitted in simultaneousPC5RX. Here, the bands that cannot be used for simultaneous transmission/reception may be individual bands rather than a band pair. For example, if simultaneousPC5RX={(21, 22), (22, 23), (23, 24), (27)} and SupportedBandperBC_simuloperation={0110}, this means that the band pair (21, 22) and the Uu are not simultaneously available for reception, the band pair (22, 23) and the Uu are simultaneously available for reception, the band pair (23, 24) and the Uu are simultaneously available for reception, and the band 27 and the Uu are not simultaneously available for reception. That is, the simultaneous transmission/reception availabilities with Uu are indicated by means of a bitmap with bits mapped to the simultaneous reception or transmission available band information entries of simultaneousPC5RX in sequence. The SupportedBandperBC_simuloperation may be divided into two subcategories: transmission information expressed in the form of a bitmap for indicating bands that are simultaneously transmittable with the Uu based on the band information and entries of simultaneousPC5TX and reception information expressed in the form of a bitmap for indicating bands that are simultaneously receivable with the Uu based on the band information and entries of simultaneousPC5RX. The eNB may perform scheduling and resource allocation based on the above information.

The number of frequency bands in which a UE is capable of operating simultaneously differs according to the band region as described above. For example, although possible to monitor all ITS 75 MHz bands in a 5 GHz band, it may be impossible to coexist (simultaneously transmit/receive) with a 2 GHz band (i.e., different carrier). Considering frequency bands that are simultaneously available for the UE to operate therein, a frequency that the UE can monitor, and the necessity for receiving a safety service, the UE may transmit sidelink UE information (SLUEInformation) at step S250 based on the order of entries in a frequency list given in the SIB21, the SLUEInformation including an indication as follows: UE interested frequency indication (UE interested freq indication) (reception frequency (RX freq)={1,2, 4} and transmission frequency (TX freq)={1}, which means that it is possible to simultaneously monitor bands 21, 22, and 24 and to use band 21 for transmission. The UE receives SIB21 at step S220; transmits UE capability information to the eNB at step S230; and transmits, if a specific V2X service is triggered or V2X traffic to be transmitted is generated at step S240, SLUE Information to the eNB at step S250. Upon receipt of the SLUEInformation, the serving eNB transmits an RRC Connection Reconfiguration message including reception (RX) pool information on the corresponding reception carrier and transmission (TX) pool information on the corresponding transmission carrier (TX/RX pool info per selected V2X freq) to the UE at step S260.

The SIB21 may include information on carriers supported per operator. In detail, the SIB21 may include carrier frequency information and corresponding TX/RX pool information and per-pool configuration information etc. The UE may receive information from another UE registered with another operator or transmit data to the corresponding UE based on the above information. The above information may be applicable to other embodiments embodied with the SIB21 including inter-carrier information.

When reporting CBRs measured on carrier frequencies indicated in the SIB21, the UE may include the information on the corresponding frequency and IDs of measured pools in the measurement report. In the case where the UE uses the frequency pools indicated via RRC dedicated signaling in mode 3 or 4, the UE may include the IDs of the respective pools and information on the frequencies included in the pools in the CBR measurement report. The above information may be applicable to other embodiments in which the eNB provides information on the frequencies and resource pools via SIB21 or RRC dedicated signaling.

Figure 3:
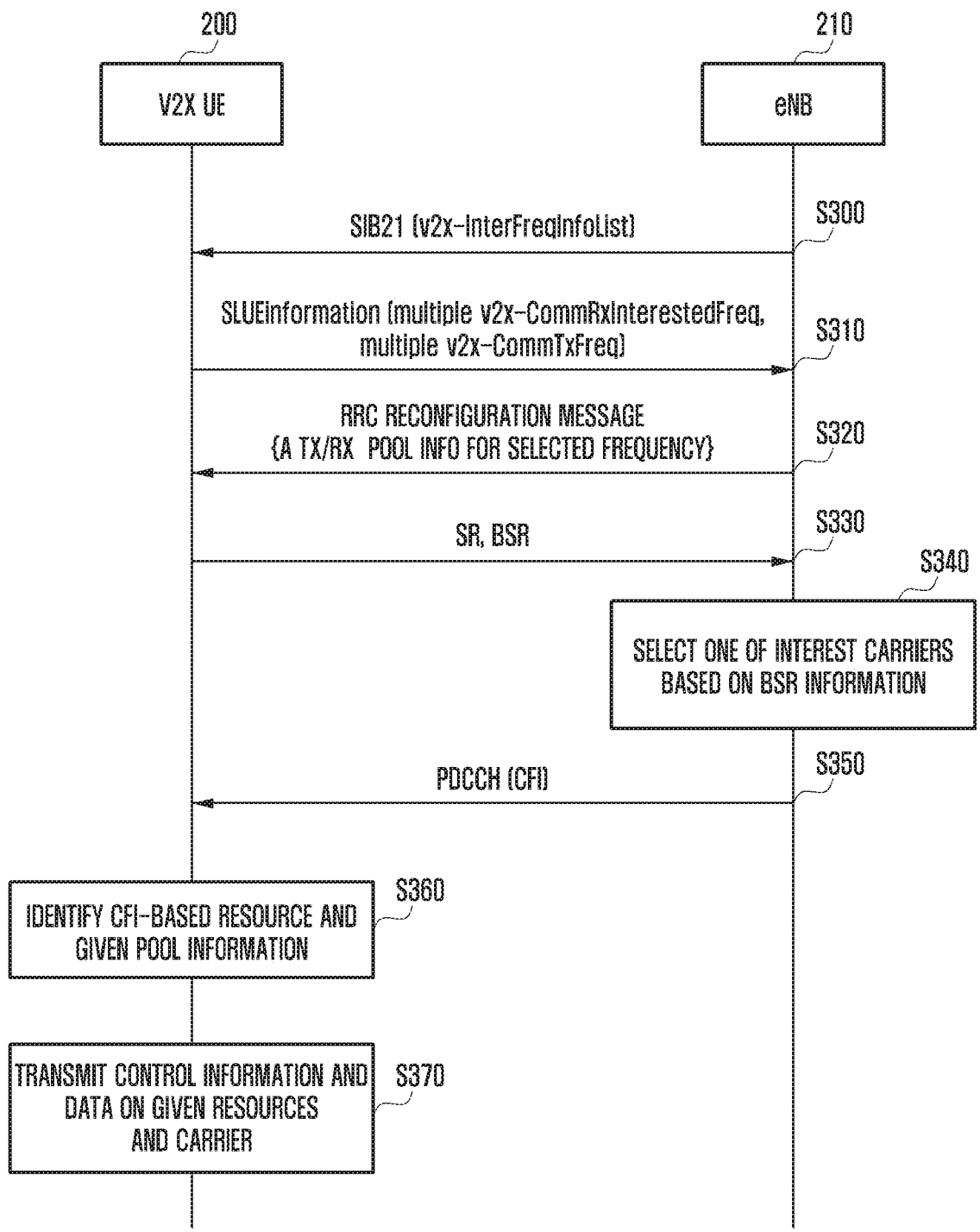

FIG. 3 depicts a method in which an eNB 210 transmits information on multiple frequencies (V2X-InterFreqInfoList) to a UE 200 at step S300, the UE selects frequencies available for use in transmission and reception among the multiple frequencies and transmits the selection result in the format (multiple V2X-CommRxInterestedFreq and multiple V2X-CommTxFreq in SLUEinformation) as described with reference to FIG. 2 to the eNB at step S310, and the eNB allocates resources finally at step S320 based on the interest frequency information received from the UE.

Here, the eNB transmits information on transmission and reception pools associated with the selected frequency to the UE via a dedicated RRC message (TX/RX pool info per selected freq in RRC Connection Reconfiguration) at step S320. If multiple frequencies are selected, information on service types available on the respective frequencies and per-frequency pool-related information are transmitted to the UE. The pool-related information may include frequency and/or time locations of the pool, a modulation scheme, a sensing configuration necessary for use of the corresponding pool, a configuration scheme for use in applying a metric such as CBR, and zone configuration information.

Upon receipt of this information, the UE requests to the eNB for resource allocation as V2X traffic property using a scheduling request (SR) or a buffer status request (BSR) at step S330. The traffic property may vary according to whether a safety or non-safety service is associated or priority information such as ProSe Per-Packet Priority (PPPP), and the BSR may include the corresponding information implicitly or explicitly. The eNB may also transmit information on an appropriate frequency selected among the frequencies that have been previously indicated to the UE, based on the traffic information, and the eNB transmit the resource location of the corresponding frequency to the UE through a PDCCH based on the traffic information at step S350. Here, the PDCCH may convey a carrier indicator (or CFI) indicating a specific frequency selected among the frequencies that the UE is interested in for transmission. If the UE receives this information, it identifies the corresponding frequency and then acquires transmission pool information of the corresponding frequency indicated in the previous dedicated RRC message. The UE acquires the remaining resource information based on the information indicated with a V2X RNTI of the PDCCH at step S360. Next, the UE transmits control information and data on the corresponding frequency at step S370.

Figure 4:
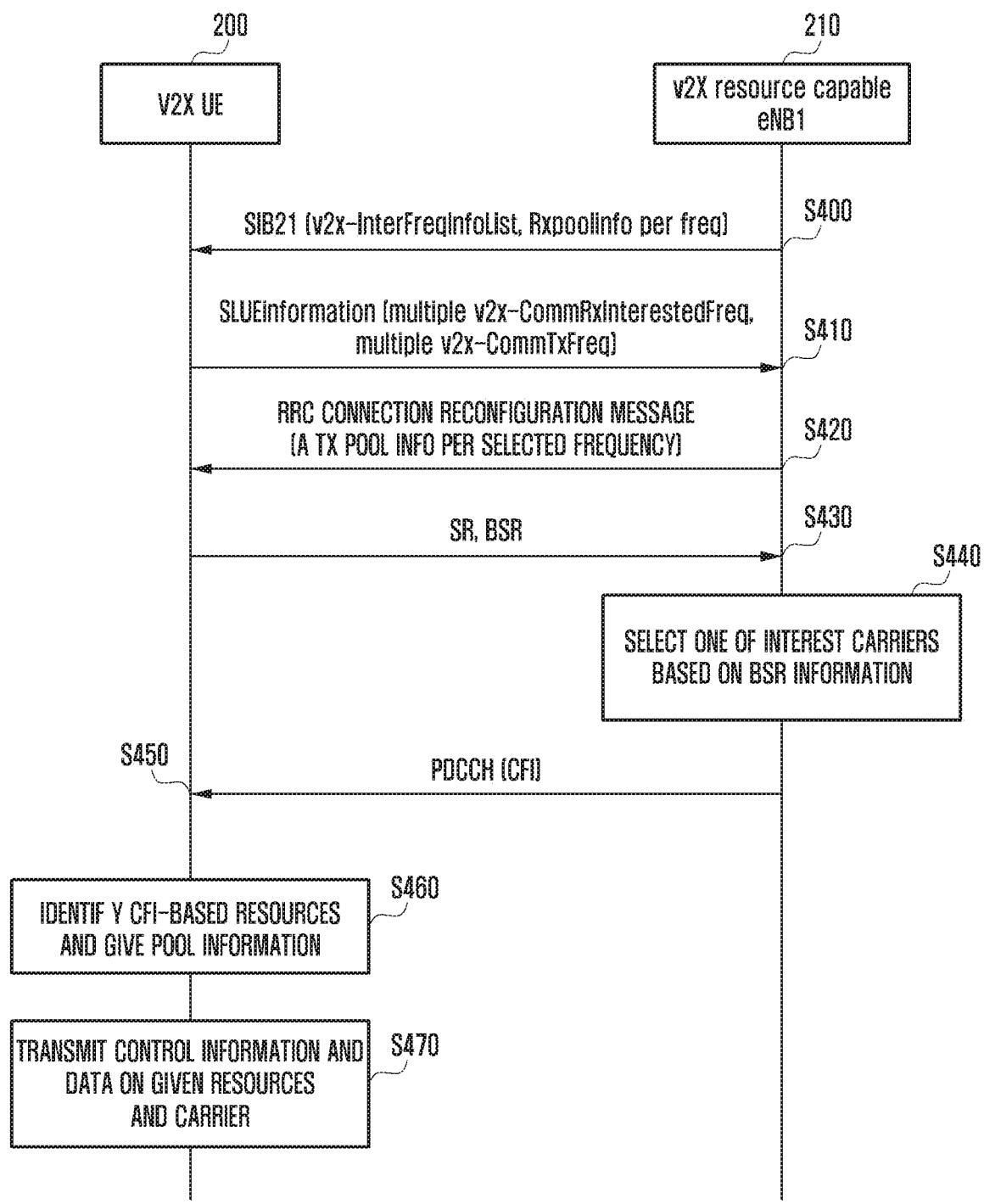

FIG. 4 depicts a method in which the eNB 210 transmits per-frequency integrated reception pool information (V2X-InterFreInfoList and Rxpoolinfo per freq) to the UE 200 via system information at step S400 and, afterward, transmits only per-frequency transmission pool information via a dedicated RRC message at step S420. In the case where the eNB transmits multiple frequency information via the system information, the system information includes per-frequency integrated reception pool information. The UE selects frequencies available for use in transmission and reception from the multiple frequencies and transmits the selection result in the format (multiple V2X-CommRxInterestedFreq and multiple V2X-CommTxFreq in SLUEinformation) as described with reference to FIG. 2 to the eNB at step S410, and the eNB makes a final resource allocation at step S420 based on the interest frequency information received from the UE.

Here, the eNB transmits information on a transmission pool associated with the selected frequency to the UE via a dedicated RRC message (TX pool info per selected freq in RRC Connection Reconfiguration) at step S420. If multiple frequencies are selected, information on service types available on the respective frequencies and per-frequency pool-related information are transmitted to the UE. The pool-related information may include frequency and/or time locations of the pool, a modulation scheme, a sensing configuration necessary for use of the corresponding pool, a configuration scheme for use in applying a metric such as CBR, and zone configuration information.

Upon receipt of this information, the UE requests to the eNB for resource allocation as V2X traffic property using an SR or a BSR at step S430. The traffic property may vary according to whether a safety or non-safety service is associated or priority information such as PPPP, and the BSR may include the corresponding information implicitly or explicitly. The eNB may select an appropriate frequency among the frequencies that have been previously indicated to the UE based on the traffic information at step S440 and may transmit information on the resource location for the case of using the frequency to the UE through a PDCCH at step S450. Here, the PDCCH may convey a carrier indicator indicating a specific frequency selected among the frequencies that the UE is interested in for transmission. If the UE receives this information, it identifies the corresponding frequency and then acquires transmission pool information of the corresponding frequency indicated in the previous dedicated RRC message. The UE acquires the remaining resource information based on the information indicated with a V2X RNTI of the PDCCH at step S460. Next, the UE transmits control information and data on the corresponding frequency at step S470.

Figure 5:
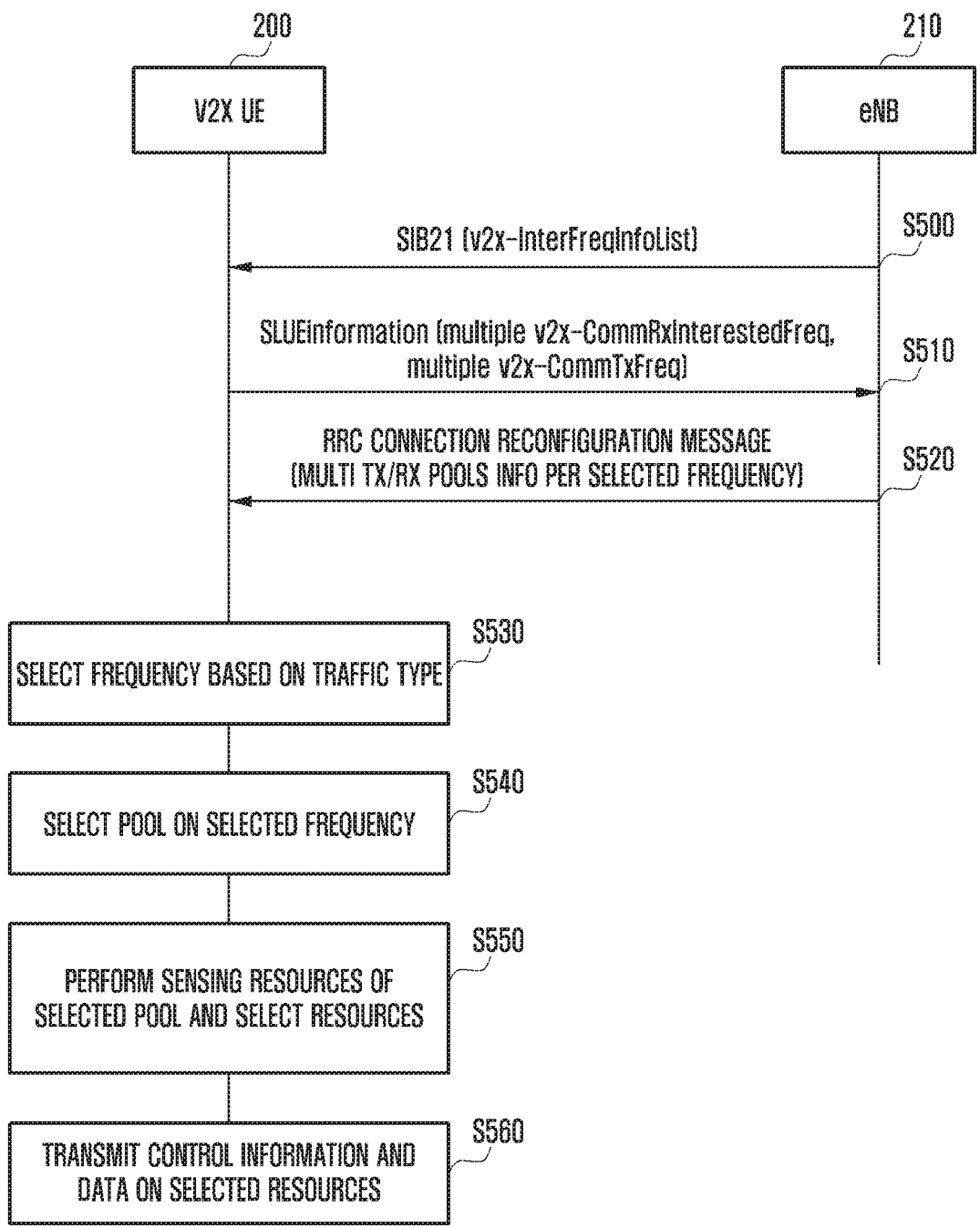
FIGS. 5 and 6 are signal flow diagrams illustrating scenarios in which a UE selects V2X resources autonomously (LTE-V2X mode 4) according to various embodiments of the disclosure.
Figure 6:
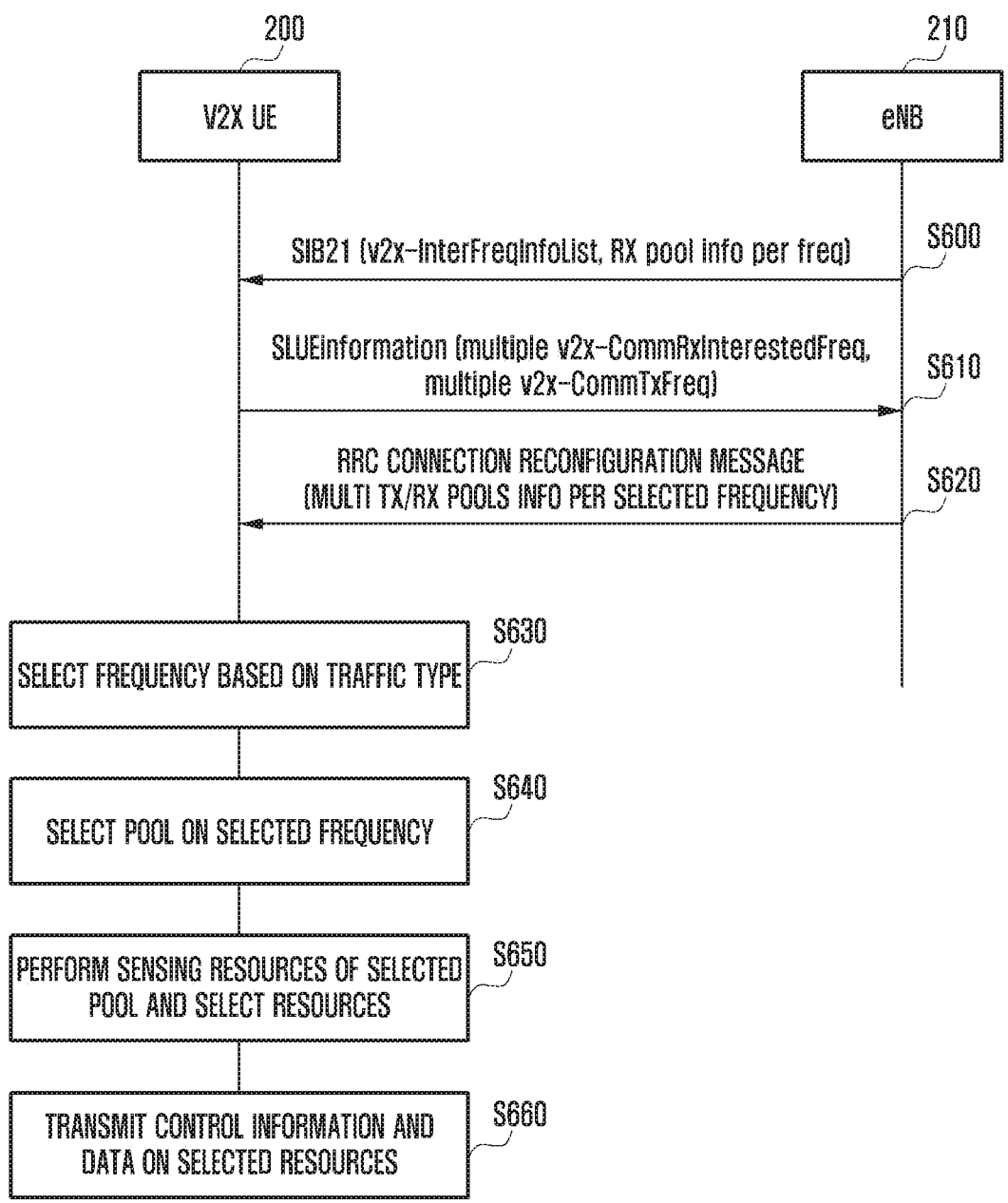

FIGS. 5 and 6 are signal flow diagrams illustrating scenarios in which a UE selects V2X resources autonomously (LTE-V2X mode 4) according to various embodiments of the disclosure.

In FIG. 5, the eNB 210 transmits information on multiple frequencies on which it can allocate resources (V2X-InterFreqInfoList) to the UE 200 via system information at step S500, and the UE notifies the eNB of preferred frequencies or frequencies available for transmission and reception (multiple V2X-CommRxInterestedFreq and multiple V2X-CommTxFreq in SLUEinformation) at step S510. The eNB may transmit information on multiple transmission and reception pools associated with all or some of the preferred frequencies to the UE at step S520. If multiple frequencies are reported by the UE, information on service types available per frequency and per-frequency pool information may be transmitted to the UE at step S520. The pool-related information may include frequency and/or time locations of the pool, a modulation scheme, a sensing configuration necessary for use of the corresponding pool, a configuration scheme for use in applying a metric such as CBR, and zone configuration information.

If V2X traffic is generated after receipt of this information, the UE selects a specific frequency according to the property of the corresponding traffic at step S530. Here, it may be possible to consider a safety/non-safety traffic property, a public/restricted service property, a propagation range class-related property, and per-frequency service categories acquired from previous system information. In the case where the UE operates in mode 4, unlike the cases of FIGS. 3 and 4, the UE has to select a specific pool among multiple transmission pools after selecting the frequency as above. If zones are configured, the selection operation may be performed based on a metric such as CBR.

The UE has to select resources in the selected pool based on a result of sensing performed according to a previously received sensing configuration; if another metric is defined, the selection may be performed based on the corresponding metric or randomly. After determining a transmission pool and resources for a specific frequency, the UE transmits control information and data through the PC5 interface using the corresponding resources.

In FIG. 6, the eNB 210 transmits, at step S600, information on multiple frequencies on which it can allocate resources (V2X-InterFreqInfoList) to the UE 200 operating in mode 4 via system information along with per-frequency reception pool information (Rxpoolinfo per freq). Upon receipt of the system information, the UE transmits information on preferred frequencies or frequencies available for transmission and reception (multiple V2X-CommRxInterestedFreq and multiple V2X-CommTxFreq in SLUEinformation) to the eNB at step S610. The eNB may transmit information on only multiple transmission pools (without information on any reception pool) in association with all or some of the preferred frequencies to the UE via a dedicated RRC message (multiple TX pools info per selected freq in RRC connection reconfiguration) at step S620. If multiple frequencies are reported by the UE, information on service types available per frequency and per-frequency pool information may be transmitted to the UE. The pool-related information may include frequency and/or time locations of the pool, a modulation scheme, a sensing configuration necessary for use of the corresponding pool, a configuration scheme for use in applying a metric such as CBR, and zone configuration information.

If V2X traffic is generated after receipt of this information, the UE selects a specific frequency according to the property of the corresponding traffic at step S630. Here, it may be possible to consider a safety/non-safety traffic property, a public/restricted service property, a propagation range class-related property, and per-frequency service categories acquired from previous system information. In the case where the UE operates in mode 4, unlike the cases of FIGS. 3 and 4, the UE has to select a specific pool among multiple transmission pools after selecting the frequency as above. If zones are configured, the selection operation may be performed based on a metric such as CBR.

The UE has to select resources in the selected pool based on a result of sensing performed according to a previously received sensing configuration; if another metric is defined, the selection may be performed based on the corresponding metric or randomly. After determining a transmission pool and resources for a specific frequency, the UE transmits control information and data through the PC5 interface using the corresponding resources.

Figure 7:
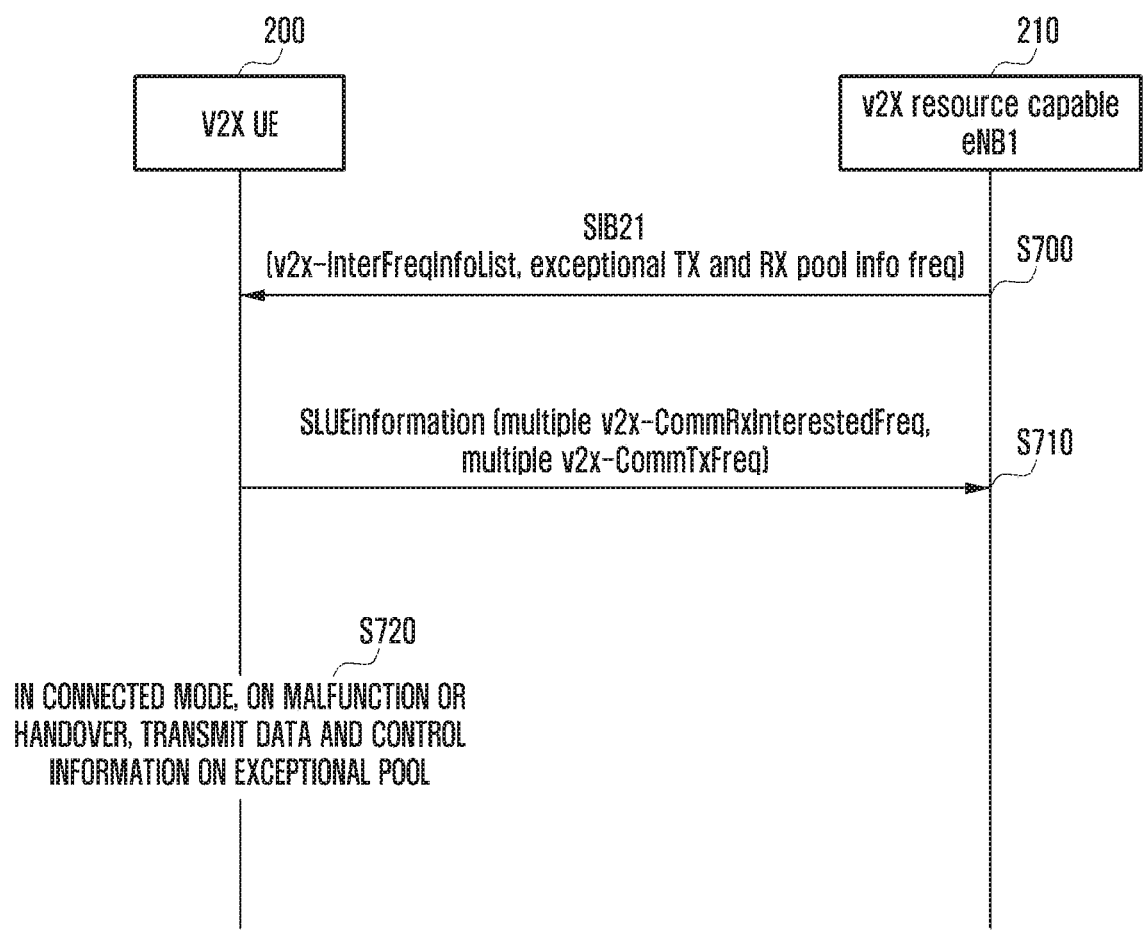
FIGS. 7 and 8 are signal flow diagrams illustrating methods for providing exceptional pools in a multi-carrier operation scenario according to various embodiments of the disclosure.
Figure 8:
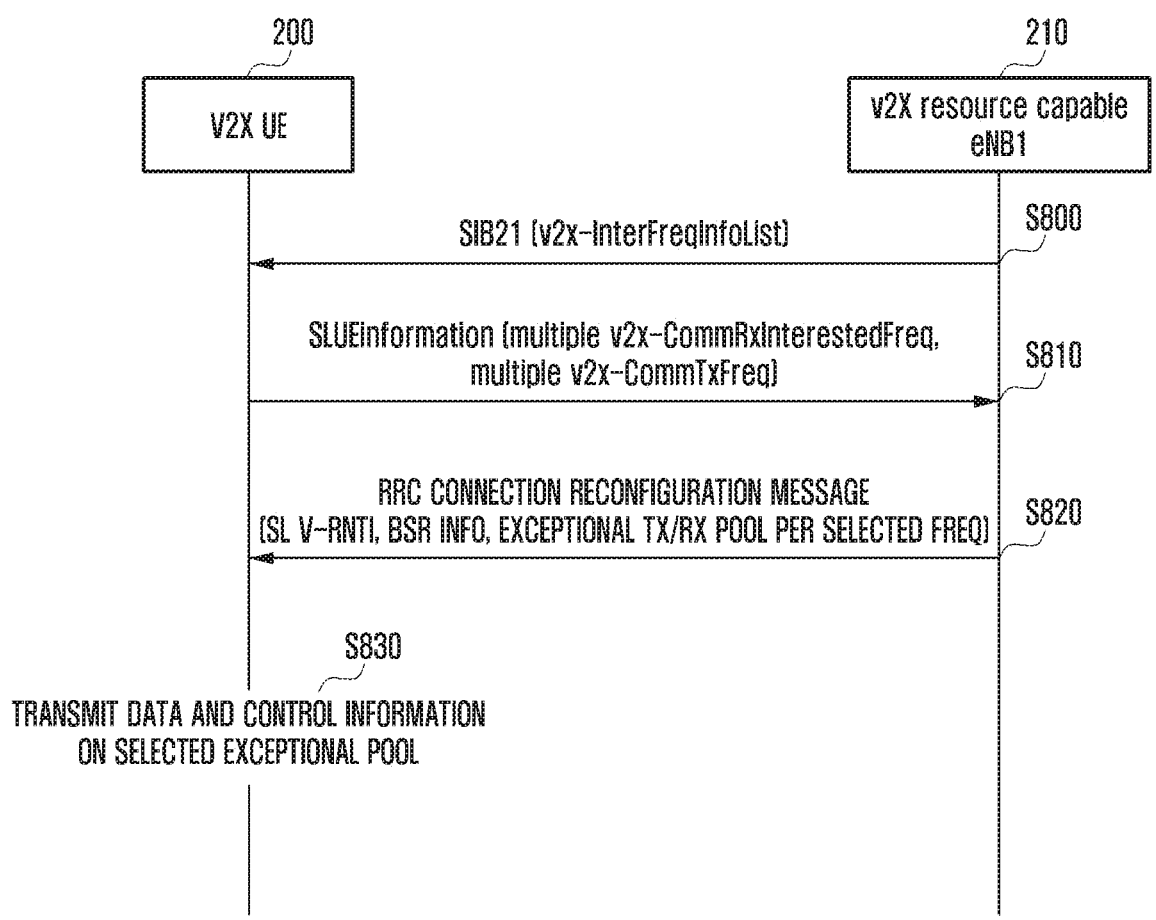

FIGS. 7 and 8 are signal flow diagrams illustrating methods for providing exceptional pools in a multi-carrier operation scenario according to various embodiments of the disclosure.

FIG. 7 is a diagram illustrating a procedure for transmitting exceptional resource information as part of inter-carrier resource information to support a multi-carrier V2X operation according to the first embodiment of the disclosure. In FIG. 7, a V2X eNB (V2X resource capable eNB1) 210 transmits multi-carrier exception resource information (V2X-InterFreqInfoList and exceptional TX/RX pool info per freq) to a UE (V2X UE) 200 via system information (e.g., SIB21) at step S700. In order to support multicarrier transmission, the eNB may transmit information on per-carrier exceptional transmission and reception pools, the exception transmission pools being notified per carrier, and the exceptional reception pools may be included in reception pools for other purposes. Upon receipt of the per-carrier exceptional TX/RX pool information from the eNB, the UE may transmit the UE's preferred reception carrier information and transmission carrier frequency information (multiple V2X-CommRxInterestedFreq and multiple V2XCommTxFreq) to the eNB via a SLUEinformation message at step S710. Afterward, if a radio link failure (RLF) (e.g., handover failure) occurs, the UE may transmit/receive data using a corresponding per-carrier exceptional TX/RX pool at step S720.

In this case, all or some of the carriers indicated by information conveyed in the SIB may have the exceptional pools. If some of the carriers have the exceptional pools, this may be indicated by inter-freqinfo list in the SIB. For example, if inter-freqinfo list={21, 22, 23, 34}, only carrier 21 has an exceptional pool with ID 1 as in exceptional RX pool={1,x,x,x}. Hereinafter, such an operation may be identically applied to all exceptional pool-related flowcharts.

In the case where an exceptional pool is given per multiple carriers, if V2X traffic is generated, the UE chooses a frequency according to a traffic property and selects resources in the exceptional pool of the corresponding frequency. The selected frequency may vary according to safety/non-safety, a public/closed service property, and a propagation range class. If the exceptional pool is configured for one frequency, the UE considers the exceptional pool of the corresponding frequency for all the types of V2X traffic in selecting resources.

If the SIB 21 transmitted by the eNB includes information on the aforementioned service types, the UE may select a carrier based on the service type and follow the configuration information on the resource pool corresponding to the selected carrier.

FIG. 8 is a diagram illustrating a procedure for transmitting exceptional resource information as part of inter-carrier resource information to support a multi-carrier V2X operation according to the second embodiment of the disclosure. In FIG. 8, the V2X eNB (V2X resource capable eNB1) 210 transmits multi-carrier frequency information (V2X-InterFreqInfoList) to the UE (V2X UE) 200 via system information (e.g., SIB21) at step S800. Upon receipt of per-carrier frequency information from the eNB, the UE may transmit the UE's preferred transmission and reception carrier frequency information (multiple V2X-CommRxInterestedFreq, multiple V2XCommTxFreq) to the eNB via a SLUEinformation message at step S810. The eNB checks the SLUEinformation message for the UE's preferred carriers and transmits a UE-specific message including multi-carrier exceptional pool resource information (exceptional TX/RX pool per selected freq) to the UE at step S820. In the disclosure, the UE-specific message is an RRC Connection Reconfiguration message. The RRC Connection Reconfiguration message may include an SL V-RNTI and BSR-related information.

If multiple frequencies are reported to the eNB, information on service types available per frequency and per-frequency pool information may be transmitted to the UE. In order to support multicarrier transmission, the eNB may transmit information on per-carrier exceptional transmission and reception pools, the exception transmission pools being notified per carrier, and the exceptional reception pools may be included in reception pools for other purposes. Afterward, if an RLF (e.g., handover failure) occurs, the UE may transmit/receive data using a corresponding per-carrier exceptional TX/RX pool at step S830.

In this case, all or some of the carriers indicated by information conveyed in the SIB may have the exceptional pools. If some of the carriers have the exceptional pools, this may be indicated by inter-freqinfo list in the SIB. For example, if inter-freqinfo list={21, 22, 23, 34}, only carrier 21 has the exceptional pool with ID 1 as in exceptional RX pool={1,x,x,x}. Hereinafter, such an operation may be identically applied to all exceptional pool-related flowcharts.

In the case where an exceptional pool is given per multiple carriers, if V2X traffic is generated, the UE chooses a frequency according to a traffic property and selects resources in the exceptional pool of the corresponding frequency. The selected frequency may vary according to safety/non-safety, a public/closed service property, and a propagation range class. If the exceptional pool is configured for one frequency, the UE considers the exceptional pool of the corresponding frequency for all the types of V2X traffic in selecting resources.

If the SIB 21 transmitted by the eNB includes information on the aforementioned service types, the UE may select a carrier based on the service type and follow the configuration information on the resource pool corresponding to the selected carrier.

FIGS. 9A, 9B, 10A, 10B, and 11 are signal flow diagrams illustrating methods of using a common normal pool in a multi-carrier operation scenario in a V2X communication system according to various embodiments of the disclosure.

The common normal pool may be a transmission or reception resource pool for use in V2X communication in a connected mode or an idle mode without the exception of a handover scenario or an RLF or out-of-coverage scenario.

Figure 9A:
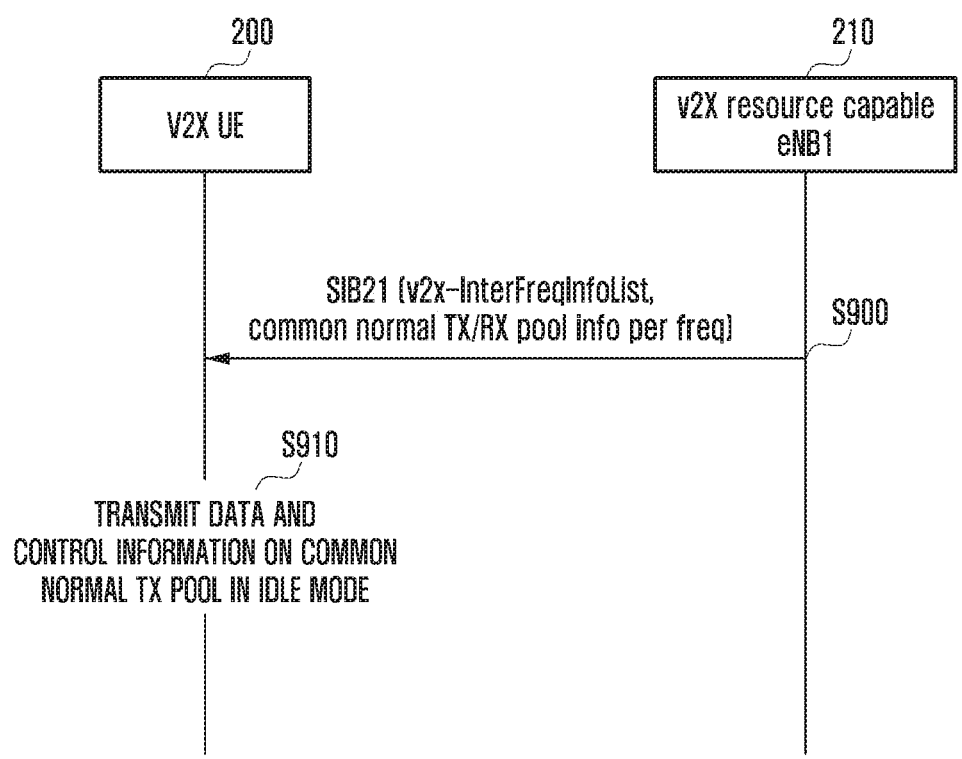
FIGS. 9A, 9B, 10A, 10B, and 11 are signal flow diagrams illustrating methods of using a common normal pool in a multi-carrier operation scenario in a V2X communication system according to various embodiments of the disclosure.
Figure 9B:
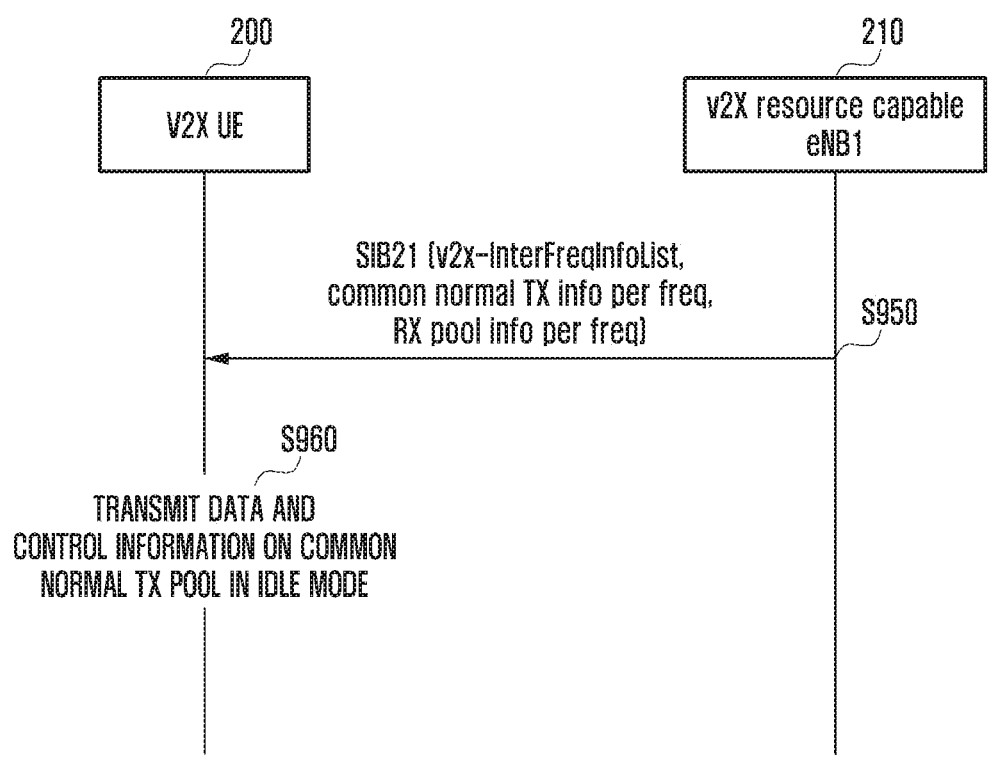

FIGS. 9A and 9B are signal flow diagrams illustrating procedures for transmitting common normal resource information as part of inter-carrier resource information to support a multicarrier V2X operation according to the first embodiment of the disclosure. In FIGS. 9A and 9B, a V2X eNB (V2X resource capable eNB1) 210 transmits multicarrier common normal resource information (V2X-Inter-FreqInfoList, etc.) to a UE (V2X UE) 200 via system information (e.g., SIB21) at steps S900 and S950.

In order to support a multicarrier operation, the eNB may notify the UE of a per-carrier common normal transmission pool and common normal reception pool (common normal TX/RX pool info per freq) at step S900 or notify the UE of the common normal transmission pool per carrier and include the common normal reception pool in reception pools for other purposes at step S950.

Upon receipt of the per-carrier common normal TX/RX pool information from the eNB, if data to be transmitted is generated in an RRC idle mode, the UE may transmit/receive data using a corresponding per-carrier common normal TX/RX pool at steps S910 and S960.

In this case, all or some of the carriers indicated by information conveyed in the SIB may have the common normal pool. If some of the carriers have the common normal pool, this may be indicated by inter-freqinfo list in the SIB. For example, if inter-freqinfo list={21, 22, 23, 34}, only carrier 21 has the common normal pool with ID 1 as in exceptional RX pool={1,x,x,x}. Hereinafter, the above information may be identically applied to other common normal pool-related embodiments.

In the case where a common normal pool is given per multiple carriers, if V2X traffic is generated, the UE chooses a frequency according to a traffic property and selects resources in the common normal pool of the corresponding frequency. The selected frequency may vary according to safety/non-safety, a public/closed service property, and a propagation range class. If the common normal pool is configured for one frequency, the UE considers the common normal pool of the corresponding frequency for all the types of V2X traffic in selecting resources.

The common normal pool may also be divided into frequencies for a safety purpose and frequencies for a non-safety purpose. If the frequencies for a safety purpose and a non-safety purpose are separated in the inter-frequency information of SIB21, the UE in the idle mode may choose a frequency according to a purpose and select a corresponding common normal pool for use.

If the SIB21 includes information on the aforementioned service types per carrier, the UE may select a carrier based on the service type and follow the configuration information on the resource pool corresponding to the selected carrier.

Figure 10A:
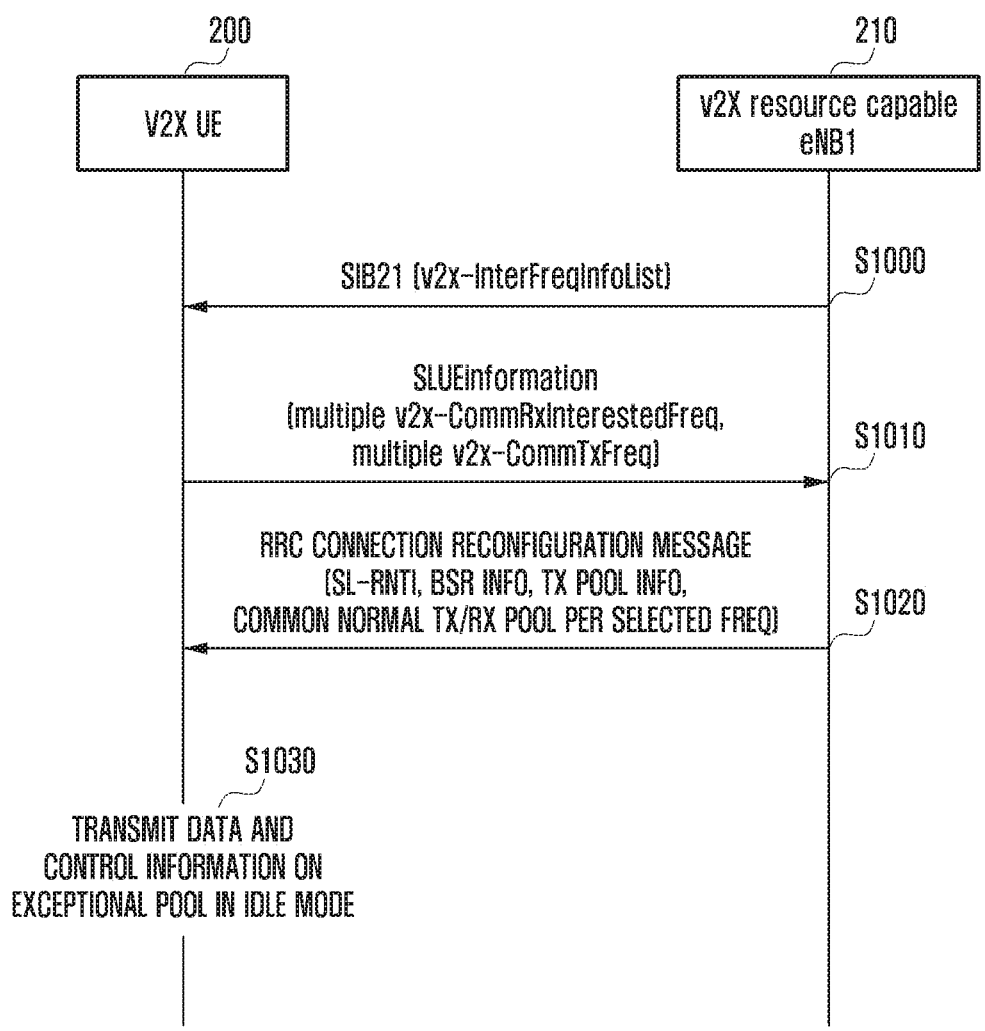
Figure 10B:
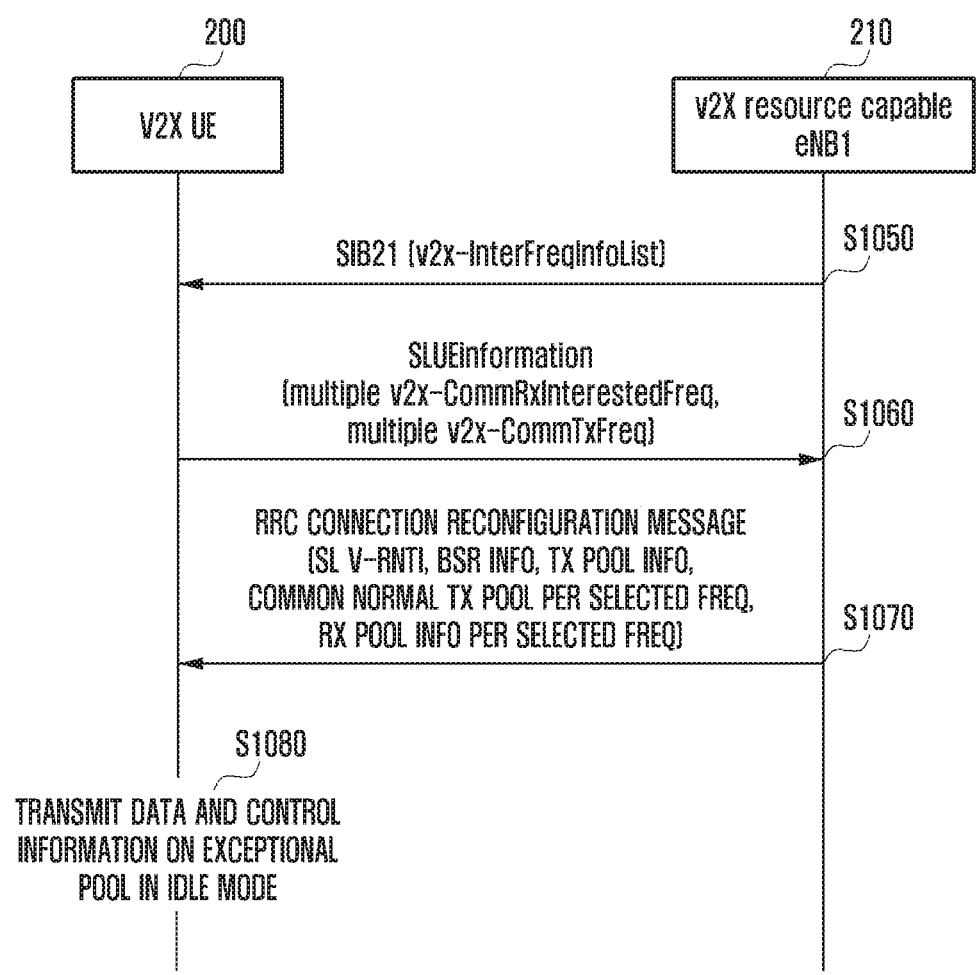

FIGS. 10A and 10B are signal flow diagrams illustrating procedures for transmitting common normal resource information as part of inter-carrier resource information to support a multicarrier V2X operation according to the second embodiment of the disclosure. In FIGS. 10A and 10B, a V2X eNB (V2X resource capable eNB1) 210 transmits multicarrier common normal resource information (V2X-Inter-FreqInfoList) to a UE (V2X UE) 200 via system information (e.g., SIB21) at steps S1000 and S1050. Upon receipt of per-carrier frequency information from the eNB, the UE may transmit the UE's preferred transmission and reception carrier frequency information (multiple V2X-CommRxInterestedFreq and multiple V2XCommTxFreq) to the eNB via a SLUEinformation message at steps S1010 and S1060. The eNB ascertains the UE's preferred carriers from the SLUEinformation information and transmits multicarrier common normal resource information to the UE via a UE-specific message at steps S1020 and S1070. In the disclosure, the UE-specific message is an RRC Connection Reconfiguration information message. The RRC Connection Reconfiguration message may include an SL V-RNTI and BSR-related information.

In order to support a multicarrier operation, the eNB may notify the UE of a per-carrier common normal transmission pool and common normal reception pool (common normal TX/RX pool per selected freq) at step S1020 or notify the UE of the per-carrier common normal transmission pool and include the common normal reception pool in reception pools for other purposes at step S1070.

After receiving the per-carrier common normal TX/RX pool information from the eNB, if the UE detects occurrence of data to be transmitted in the RRC idle mode, it may transmit/receive data using the corresponding per-carrier common normal TX/RX pool at steps S1030 and S1080.

In this case, all or some of the carriers indicated by information conveyed in the SIB may have the common normal pool. If some of the carriers have the common normal pool, this may be indicated by inter-freqinfo list in the SIB. For example, if inter-freqinfo list={21, 22, 23, 34}, only carrier 21 has the common normal pool with ID 1 as in exceptional RX pool={1,x,x,x}. Hereinafter, the above information may be identically applied to other common normal pool-related embodiments.

In the case where a common normal pool is given per multiple carriers, if V2X traffic is generated, the UE chooses a frequency according to a traffic property and selects resources in the common normal pool of the corresponding frequency. The selected frequency may vary according to safety/non-safety, a public/closed service property, and a propagation range class. If the common normal pool is configured for one frequency, the UE considers the common normal pool of the corresponding frequency for all the types of V2X traffic in selecting resources.

The common normal pool may be also divided into frequencies for a safety purpose and frequencies for a non-safety purpose. If the frequencies for a safety purpose and a non-safety purpose are separated in the inter-frequency information of SIB21, the UE in the idle mode may choose a frequency according to a purpose and select a corresponding common normal pool for use.

If the SIB21 includes information on the aforementioned service types per carrier, the UE may select a carrier based on the service type and follow the configuration information on the resource pool corresponding to the selected carrier.

Figure 11:
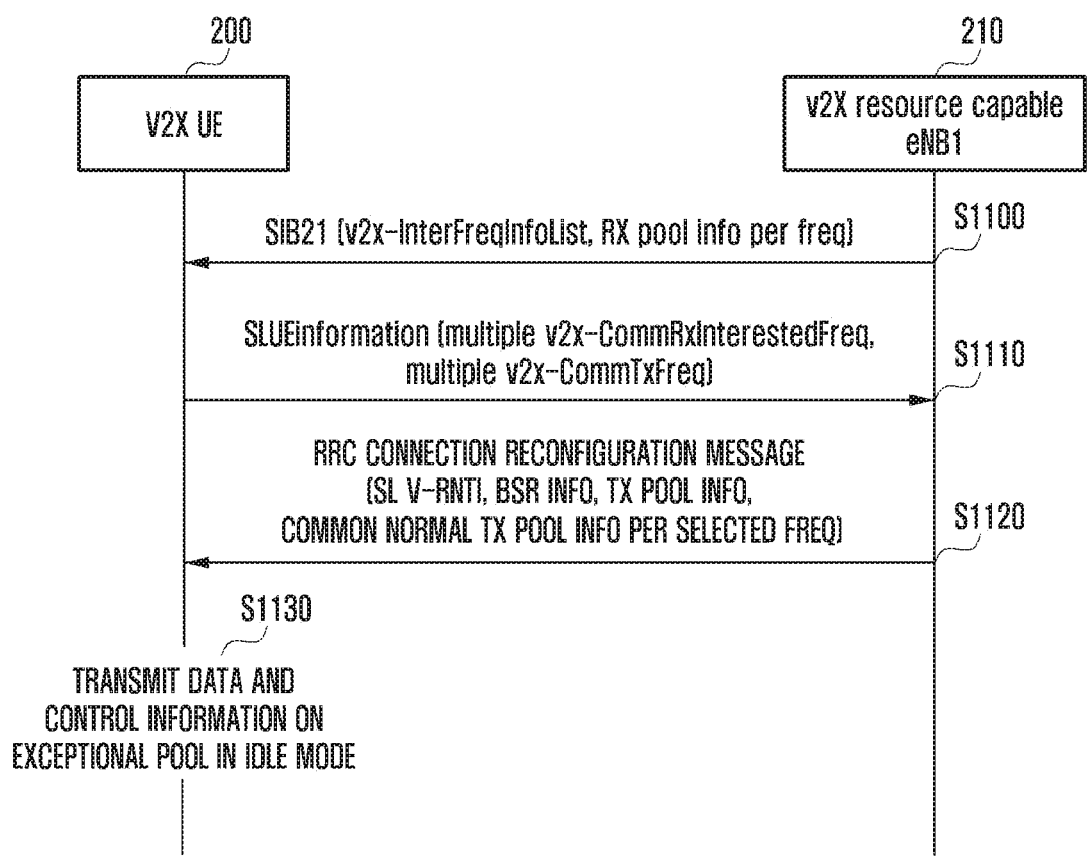

FIG. 11 is a signal flow diagram illustrating a procedure for transmitting common normal resource information as part of inter-carrier resource information to support a multicarrier V2X operation according to the third embodiment of the disclosure. In FIG. 11, a V2X eNB (V2X resource capable eNB1) 210 transmits multicarrier common normal resource information (V2X-InterFreqInfoList) to a UE (V2X UE) 200 via system information (e.g., SIB21) at step S1100. Upon receipt of per-carrier frequency information from the eNB, the UE may transmit the UE's preferred transmission and reception carrier frequency information (multiple V2X-CommRxInterestedFreq and multiple V2XCommTxFreq) to the eNB via a SLUEinformation message at step S1110.

The eNB ascertains the UE's preferred carriers from the SLUEinformation information and transmits multicarrier common normal resource information to the UE via a UE-specific message at step S1120. In the disclosure, the UE-specific message is an RRC Connection Reconfiguration information message. In order to support multicarrier transmission, the eNB transmits the RRC Connection Reconfiguration message including per-carrier common normal transmission pool information (common normal TX pool info per selected freq) to the UE. After receiving the per-carrier common normal transmission pool information from the eNB, if the UE detects occurrence of data to be transmitted in the idle mode, it may transmit/receive data using the corresponding per-carrier common normal transmission pool.

In this case, all or some of the carriers indicated by information conveyed in the SIB may have the common normal pool. If multiple frequencies are reported, information on service types available per frequency and per-frequency pool information may be transmitted to the UE. If some of the carriers have the common normal pool, this may be indicated by inter-freqinfo list in the SIB. For example, if inter-freqinfo list={21, 22, 23, 34}, only carrier 21 has a common normal pool with ID 1 as in exceptional RX pool={1,x,x,x}. Hereinafter, the above information may be identically applied to other common normal pool-related embodiments.

In the case where a common normal pool is given per multiple carriers, if V2X traffic is generated, the UE chooses a frequency according to a traffic property and selects resources in the common normal pool of the corresponding frequency. The selected frequency may vary according to safety/non-safety, a public/closed service property, and a propagation range class. If the common normal pool is configured for one frequency, the UE considers the common normal pool of the corresponding frequency for all the types of V2X traffic in selecting resources.

The common normal pool may be also divided into frequencies for a safety purpose and frequencies for a non-safety purpose. If the frequencies for a safety purpose and a non-safety purpose are separated in the inter-frequency information of SIB21, the UE in the idle mode may choose a frequency according to a purpose and select a corresponding common normal pool for use.

If the SIB21 includes information on the aforementioned service types per carrier, the UE may select a carrier based on the service type and follow the configuration information on the resource pool corresponding to the selected carrier.

FIGS. 12A, 12B, 13, and 14 are diagrams illustrating how to configure zones and manage resources per zone according to various embodiments of the disclosure.

A zone configuration may include V2X inter-carrier information and V2X frequency resource pool information. Channel busy ratio (CBR) information on a zone configuration-based pool may include pools measured by a UE and V2X frequencies corresponding to the pools.

In a V2X communication system, it may be possible to configure V2X data transmission/reception resources (resource pool) for use by a UE based on geographical position information. That is, the V2X communication system may be able to configure zones according to geographical positions and determine a resource pool for use by a UE according to the zone in which the UE is located. The resource pool may include at least one of resources for the UE located within a zone to transmit V2X data or resources for the UE located within the zone to receive V2X data.

Figure 12A:
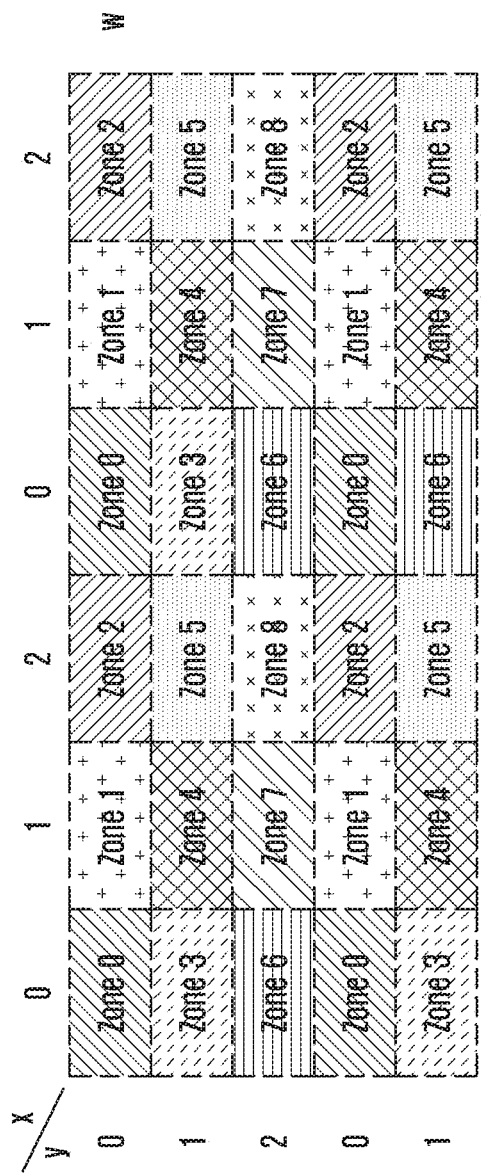
FIGS. 12A, 12B, 13, and 14 are diagrams illustrating how to configure zones and manage resources per zone according to various embodiments of the disclosure.

The geographical position-based zone configuration may be made as shown in FIG. 12A by way of example. FIG. 12A is a diagram illustrating an exemplary geographical position-based zone configuration. Zone IDs and corresponding resource pool information may be included in system information or a dedicated RRC message being transmitted by an eNB. The resource pool information corresponding to the zone IDs may be preconfigured between a V2X UE and an eNB.

The zone configuration-based resource pool information may be used in a V2X system supporting a single frequency band or multiple frequency bands. In the V2X system supporting multiple frequency bands, per-frequency zone configuration and corresponding resource pool information may be transmitted to the UE. The per-frequency zone configuration and resource pool information may be included in a system information message broadcast by the eNB or a dedicated RRC message transmitted from the eNB to the UE or preconfigured in the UE. The zone configuration and resource pool information may vary with frequency.

A description is made hereinafter of the signal flows between a UE and an eNB for processing per-frequency zone configuration and resource pool information included in system information with reference to FIG. 12B.

Figure 12B:
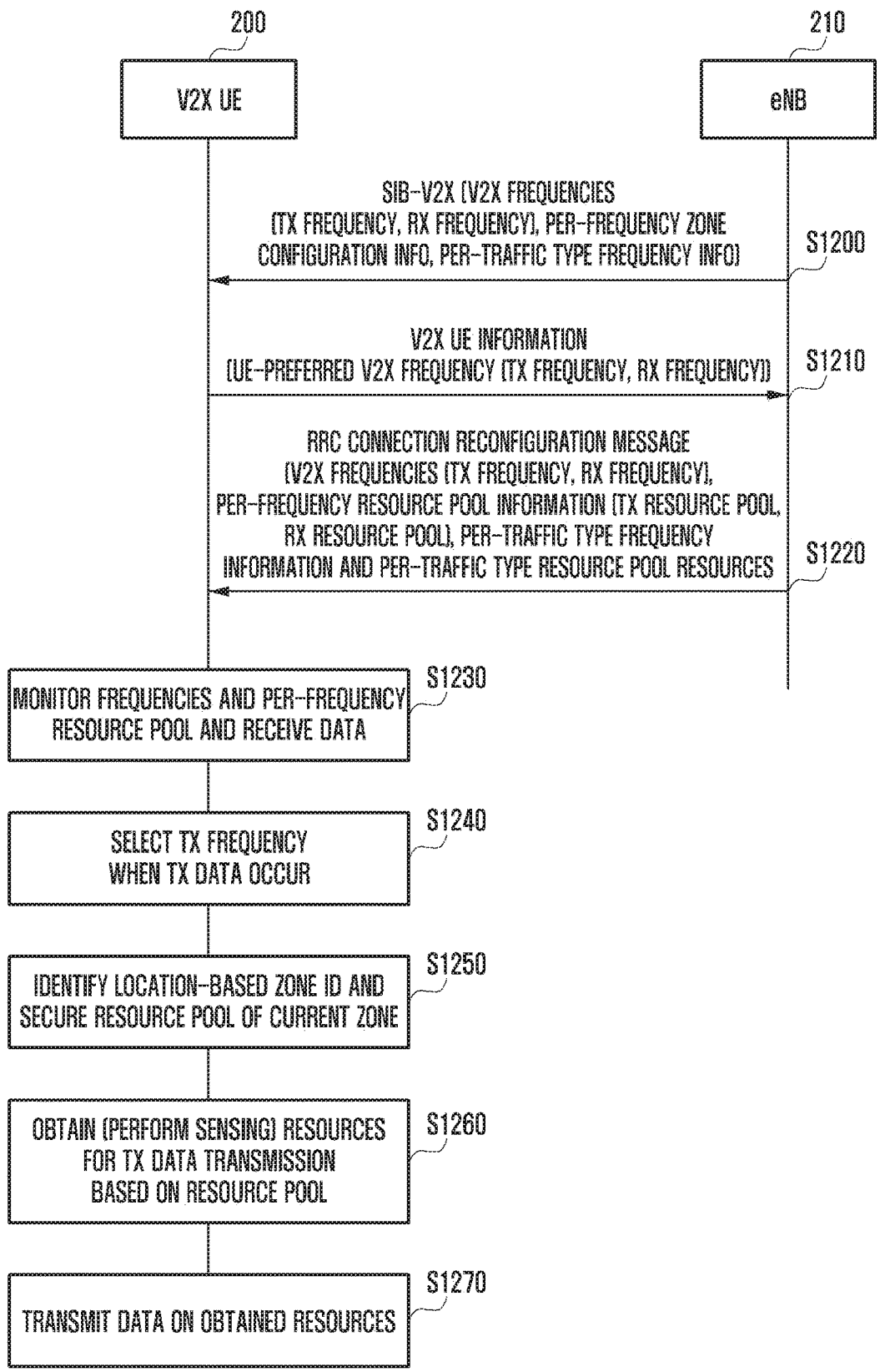

FIG. 12B is a signal flow diagram illustrating a method for processing an inter-carrier-based zone configuration using system information according to the first embodiment of the disclosure.

At step S1200, a UE 200 supporting a V2X service may receive an SIB-V2X message transmitted by an eNB 210 supporting the V2X service. The SIB-V2X message may include at least one of a frequency necessary for receiving the V2X service of the eNB, a transmission resource pool, a reception resource pool, configuration information per traffic type, per-frequency transmission resource pool according to a zone configuration, or per-frequency reception resource pool according to a zone configuration.

If the UE wants to receive the V2X service from the eNB after the receipt of the SIB-V2X information, it may transmit a V2X UE Information message to the eNB at step S1210. The V2X UE Information message may include at least one of the UE's preferred V2X frequency information about an interested V2X service, preferred V2X transmission frequency information, preferred V2X reception frequency information, or an indicator indicating whether the UE supports zone configuration-based resource pool selection. In the V2X UE Information, the frequency information being transmitted by the UE may be in the form of a frequency index and interpreted by referencing the frequency information included in the SIB-V2X message received at step S1200. The UE may select the preferred V2X frequency for receiving the V2X service based on criteria such as service/traffic type supported on the V2X frequency, the UE's hardware capability (an number of transmission chains, a number of reception chains, an in-band simultaneous transmission supportability, an in-band simultaneous reception supportability, an entire band simultaneous transmission supportability, an entire band simultaneous reception supportability, etc.), the UE's subscription information (PLMN), or a UE type (vehicle UE, pedestrian UE, road side unit (RSU) UE, etc.). The UE's hardware capability information may be transmitted to the eNB via a UE capability message as well as the V2X UE Information message.

If it is determined that the UE wants to receive the V2X service, the eNB may transmit, at step S1220, a dedicated RRC message (RRC Connection Reconfiguration message) including V2X frequency information and resource pool information to the UE. The dedicated RRC message may include at least one of a V2X frequency to be used by the UE and a transmission resource pool of the V2X frequency, a reception resource pool of the V2X frequency, a V2X frequency per traffic type for the UE and transmission resource pool of the V2X frequency, a reception resource pool of the V2X frequency, a V2X frequency for use by the UE and zone configuration information of the V2X frequency, a transmission resource pool corresponding to the zone configuration, or a reception resource pool corresponding to the zone configuration. The V2X frequency information being transmitted from the eNB to the UE may be determined based on at least one of the hardware capability information transmitted by the UE, the hardware capability and preferred frequency information included in the V2X UE Information message, or the traffic type of data that must be transmitted/received by the V2X UE. At step S1220, the eNB may perform scheduling by allocating the zone configuration transmission pool resources corresponding to the V2X frequency on which the UE transmits/receives the service data and provide information on a zone configuration transmission pool to be selected by the UE.

The UE may ascertain frequencies, per-frequency transmission resource pools, per-frequency reception resource pools, frequency information per traffic type and corresponding transmission/reception resource pool, and per-frequency zone configuration and corresponding transmission/reception resource pool information from the SIB-V2X message and dedicated RRC message, select a V2X frequency based on the above information, and monitor the reception resource pool corresponding to the frequency to receive V2X data at step S1230. If the UE detects occurrence of data to be transmitted, it ascertains frequencies, per-frequency transmission/reception resource pools, frequency information per traffic type and corresponding transmission/reception resource pool, and per-frequency zone configuration and corresponding transmission/reception resource pool information from the SIB-V2X message and dedicated RRC message and selects a transmission frequency for use in transmitting the data based on the above information at step S1240.

At step S1250, the UE may acquire a zone ID and a transmission resource pool based on its location, the frequency to be used for its transmission and the zone configuration information about the frequency. At step S1260, the UE may sense the transmission resource pool acquired at step S1250 to obtain resources for transmitting the data. At step S1270, the UE may transmit V2X data on the obtained transmission resources.

The per-frequency zone configuration information conveyed in the SIB-V2X message may be common in all PLMNs or dedicated to a specific PLMN. The SIB-V2X message may include an indicator indicating whether the per-frequency zone configuration is common in all PLMNs.

Meanwhile, the UE measure a channel busy ratio on the transmission pool of the zone selected at step S1250 or the transmission resources selected at step S1260. The UE may report the measured channel busy ratio to the eNB. A channel busy ratio report message being transmitted from the UE to the eNB may include at least one of a frequency, a transmission resource pool, a zone ID, a zone configuration, or a channel busy ratio level. The UE may measure a channel busy ratio on certain resources and transmit a channel busy ratio report message according to an instruction from the eNB. The eNB may transmit information on the frequency and resource pool on which the UE has to perform channel busy ratio measurement and report a measured channel busy ratio level.

In an alternative embodiment, the eNB may transmit to the UE the per-frequency zone configuration information, transmission resource pools corresponding to the per-frequency zone configuration, and reception resource pools corresponding to the per-frequency zone configuration via a dedicated RRC message.

Figure 13:
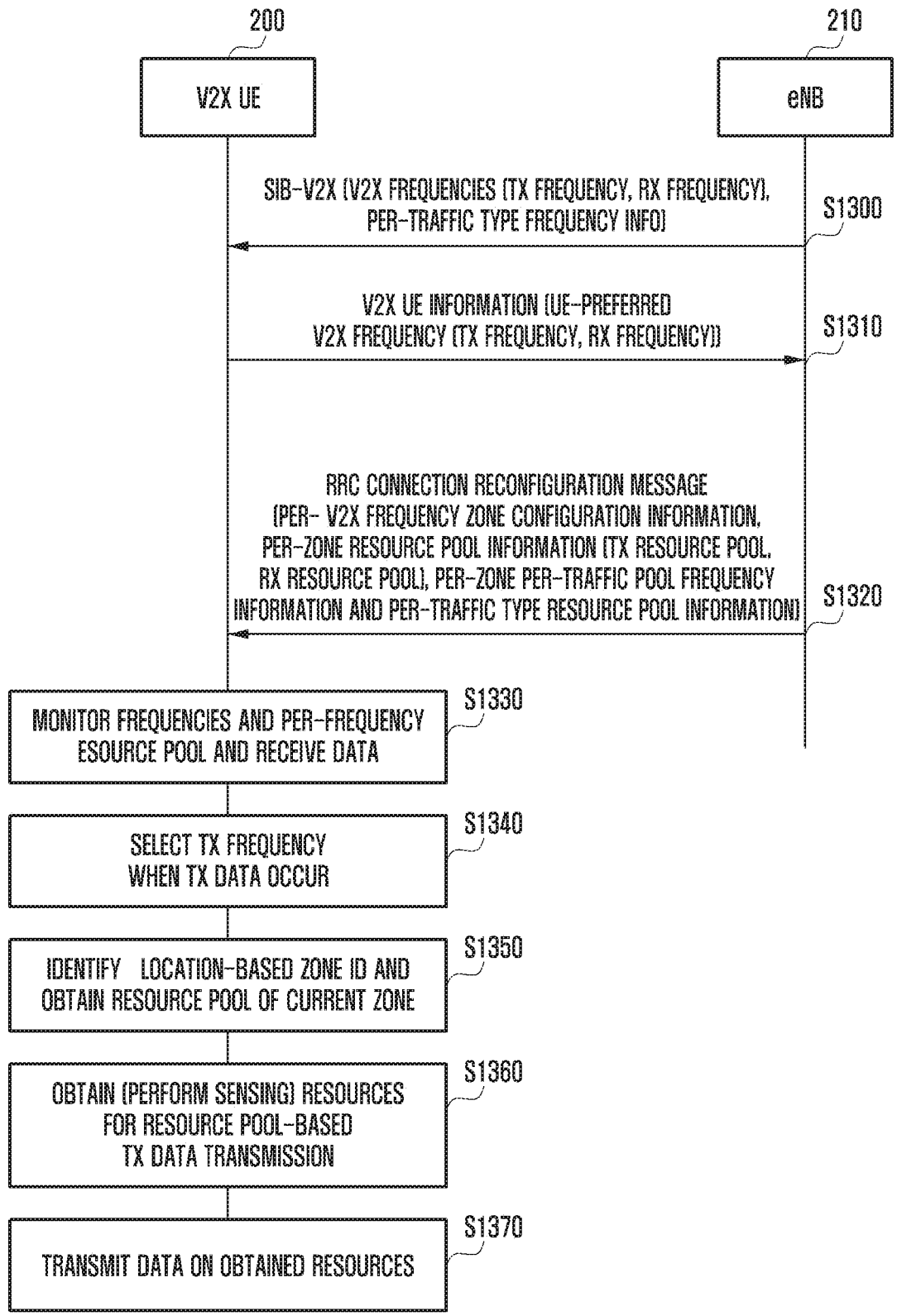

FIG. 13 is a signal flow diagram illustrating a method for processing an inter-carrier-based zone configuration using a dedicated RRC message according to the second embodiment of the disclosure.

At step S1300, a UE 200 supporting a V2X service may receive an SIB-V2X message transmitted by an eNB 210 supporting the V2X service. The SIB-V2X message may include at least one of a frequency necessary for receiving the V2X service of the eNB, a transmission resource pool, a reception resource pool, per-traffic type frequency information, per-traffic type transmission resource pools, or per-traffic type reception resource pools.

If the UE wants to receive the V2X service from the eNB after the receipt of the SIB-V2X information, it may transmit a V2X UE Information message to the eNB at step S1310. The V2X UE Information message may include at least one of the UE's preferred V2X frequency information about an interested V2X service, preferred V2X transmission frequency information, preferred V2X reception frequency information, or an indicator indicating whether the UE supports zone configuration-based resource pool selection. In the V2X UE Information, the frequency information being transmitted by the UE may be in the form of a frequency index and interpreted by referencing the frequency information included in the SIB-V2X message received at step S1300.

The UE may select the preferred V2X frequency for receiving the V2X service based on criteria such as service/traffic type supported on the V2X frequency, the UE's hardware capability (an number of transmission chains, a number of reception chains, an in-band simultaneous transmission supportability, an in-band simultaneous reception supportability, an entire band simultaneous transmission supportability, an entire band simultaneous reception supportability, etc.), the UE's subscription information (PLMN), or a UE type (vehicle UE, pedestrian UE, road side unit (RSU) UE, etc.). The UE's hardware capability information may be transmitted to the eNB via a UE capability message as well as the V2X UE Information message.

If it is determined that the UE wants to receive the V2X service, the eNB may transmit, at step S1320, a dedicated RRC message (RRC Connection Reconfiguration message) including V2X frequency information and resource pool information to the UE. The eNB may also include per-frequency zone configuration information in the dedicated RRC message in order for the UE to perform zone configuration-based resource pool management. The dedicated RRC message may include at least one of a V2X frequency to be used by the UE and a transmission resource pool of the V2X frequency, a reception resource pool of the V2X resources, a V2X frequency per traffic type for the UE and transmission resource pool of the V2X frequency, a reception resource pool of the V2X frequency, V2X frequency for use by the UE and zone configuration information of the V2X frequency, a transmission resource pool corresponding to the zone configuration, a reception resource pool corresponding to the zone configuration, or zone configuration information in per-V2X traffic type frequency and transmission/reception resource pool information corresponding to the zone configuration. The V2X frequency information being transmitted from the eNB to the UE may be determined based on at least one of the hardware capability information transmitted by the UE, the hardware capability and preferred frequency information included in the V2X UE Information message, or the traffic type of data that must be transmitted/received by the V2X UE. At step S1320, the eNB may perform scheduling by allocating the zone configuration transmission pool resources corresponding to the V2X frequency on which the UE transmits/receives the service data and provide information on a zone configuration transmission pool to be selected by the UE.

The UE may ascertain frequencies, per-frequency transmission resource pools, per-frequency reception resource pools, frequency information per traffic type and corresponding transmission/reception resource pool, and per-frequency zone configuration and corresponding transmission/reception resource pool information from the dedicated RRC message, select a V2X frequency based on the above information, and monitor the reception resource pool corresponding to the frequency to receive V2X data at step S1330.

In the case where the V2X frequency information about the zone configuration that is included in the dedicated RRC message is signaled by referencing the SIB-V2X, the UE may ascertain the frequencies, per-frequency transmission resource pools, per-frequency reception resource pools, frequency information per traffic type and corresponding transmission/reception resource pool, and per-frequency zone configuration and corresponding transmission/reception resource pool information by referencing both the SIB-V2X and the dedicated RRC message, select a V2X frequency based on the above information, and monitor the reception resource pool corresponding to the frequency to receive V2X data. At step 1330, the V2X frequency information about the zone configuration in the dedicated RRC message may include a V2X-SIB message sequence number (interfreqInfo may be arranged in a specific order within SIB and, in this case, it may be possible to use a predefined frequency order rather than the frequency ID for indicating a specific frequency in subsequent dedicated RRC messages) and an index mapped to the frequency indicated in the V2X-SIB message.

If the UE detects occurrence of data to be transmitted, it may select a transmission frequency for use in transmitting the data based on frequencies, per-frequency transmission/reception resource pools, frequency information per traffic type and corresponding transmission/reception resource pool, and per-frequency zone configuration and corresponding transmission/reception resource pool information from the SIB-V2X message and dedicated RRC message at step S1340. At step S1350, the UE may acquire a zone ID and a transmission resource pool based on its location, the frequency to be used for its transmission, and the zone configuration information about the frequency. At step S1360, the UE may sense the transmission resource pool acquired at step S1350 to obtain resources for transmitting the data. At step S1370, the UE may transmit V2X data on the obtained transmission resources.

The per-frequency zone configuration information conveyed in the dedicated RRC message may be common in all PLMNs or dedicated to a specific PLMN. The dedicated RRC message may include an indicator indicating whether the per-frequency zone configuration is common in all PLMNs.

Meanwhile, the UE measures a channel busy ratio on the transmission pool of the zone selected at step S1350 or the transmission resources selected at step S1360. The UE may report the measured channel busy ratio to the eNB. A channel busy ratio report message being transmitted from the UE to the eNB may include at least one of a frequency, a transmission resource pool, a zone ID, a zone configuration, or a channel busy ratio level. The UE may measure a channel busy ratio on certain resources and transmit a channel busy ratio report message according to an instruction from the eNB. The eNB may transmit information on the frequency and resource pool on which the UE has to perform channel busy ratio measurement and report a channel measurement ratio level.

In the third embodiment, per-frequency zone configuration information of V2X transmission and reception resource pools is preconfigured in the UE. The per-frequency zone configuration information of V2X transmission and reception resource pools may be preconfigured in a subscriber Identification Module (SIM) of the UE or downloaded in an over-the-air (OTA) manner. The preconfigured per-frequency zone configuration information may include at least one of frequencies, per-frequency zone configurations, transmission resource pools corresponding to per-frequency zone configurations, or reception resource pools corresponding to per-frequency zone configurations. The per-frequency zone configuration resource pool information for receiving the V2X service may be common in all PLMNs or dedicated to a specific PLMN.

Figure 14:
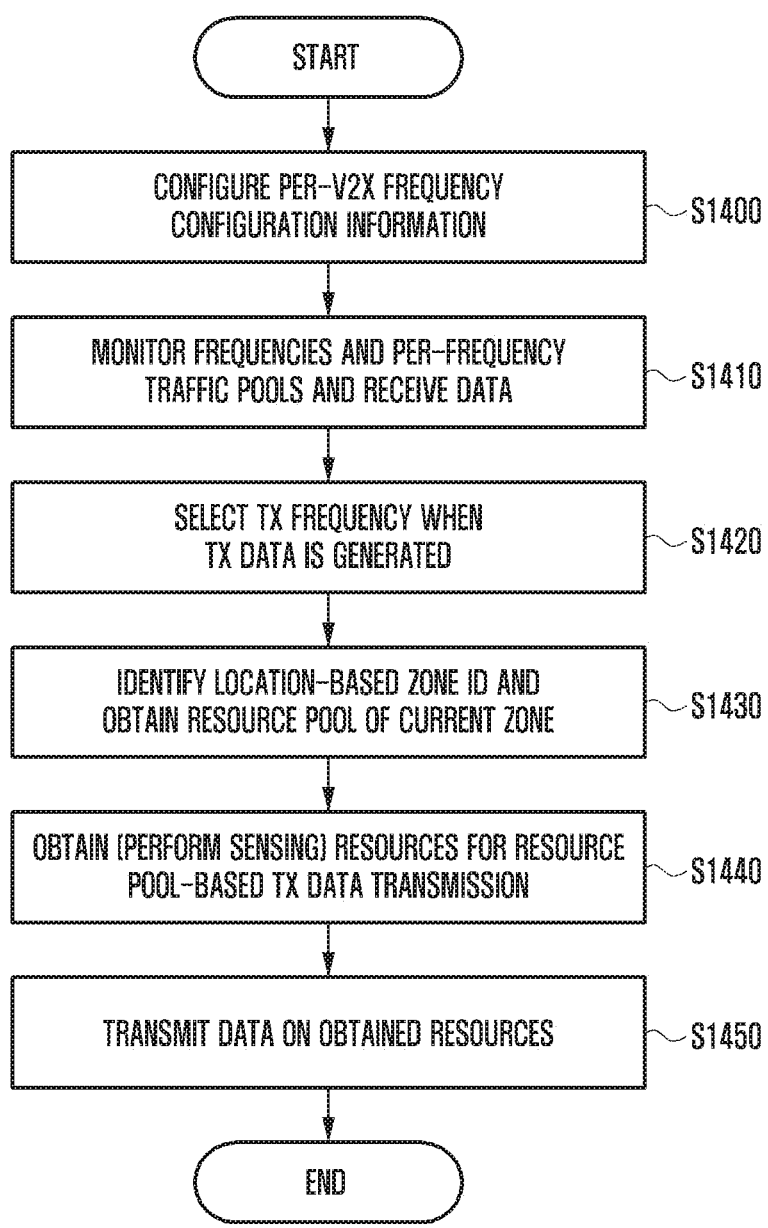

FIG. 14 is a flowchart illustrating a method for processing an inter-carrier-based zone configuration using preconfigured information according to the third embodiment of the disclosure.

At step S1400, the UE is preconfigured with per-2× frequency zone configuration information and transmission/reception resource pool information corresponding to the per-V2X frequency zone configuration. The zone configuration information may include per-V2X traffic type frequencies, zone configurations corresponding to the per-V2X traffic type frequencies, and transmission/reception resource pool information of the zone configurations. The zone configuration information may include per-PLMN V2X frequencies and zone configuration information about frequencies corresponding to the per-PLMN V2X frequencies. At step S1410, the UE may select a per-frequency zone configuration based on the preconfigured information, select a V2X frequency based on the transmission/reception resource pool information corresponding to the zone configuration, and monitor the reception resource pool corresponding to the frequency to receive V2X data. In an alternative embodiment, the UE may identify the per-traffic type V2X frequencies and zone configuration information corresponding thereto and the per-zone transmission/reception resource pool information based on the preconfigured information, select a V2X frequency corresponding to the traffic type desired to be transmitted/received based on the identified information, and monitor a reception resource pool corresponding to the selected frequency to receive V2X data. In an alternative embodiment, the UE may ascertain a preferred PLMN or a frequency per operation-configured PLMN and zone configuration information corresponding thereto from the preconfigured information, select a V2X frequency of the corresponding PLMN based on the ascertained information, and monitor a reception resource pool corresponding to the selected frequency to receive V2X data.

If the UE detects occurrence of data to be transmitted, it may select, at step S1420, a transmission frequency for use in transmitting the data based on the predetermined V2X frequency and per-frequency zone configuration, the transmission/reception resource pool corresponding to the zone configuration, and per-traffic type frequency information and zone configuration and a transmission/reception resource pool corresponding thereto that are preconfigured at step S1400. At step S1430, the UE may acquire a zone ID and a transmission resource pool based on its location, a frequency for use in transmission, and zone configuration information corresponding to the frequency. At step S1400, the UE may secure the resources for use in transmitting the data by sensing the preconfigured transmission resource pool. At step S1450, the UE may transmit V2X data on the secured transmission resources.

Meanwhile, the UE may measure a channel busy ratio on the transmission resource pool ascertained at step S1430 or the transmission resources ascertained at step S1440. The UE may report the measured channel busy ratio to the eNB. The channel busy ratio report message being transmitted from the UE to the eNB may include at least one of a frequency, a transmission resource pool, a zone ID, a zone configuration, or a channel busy ratio level. The UE may measure the channel busy ratio on certain resources based on the zone configuration according to an instruction from the eNB. The eNB may transmit information on the frequency and resource pool on which the UE has to perform channel busy ratio measurement and report a measured channel busy ratio level.

Hereinafter, a description is made of the multicarrier operation in a V2X service-related out-of-coverage scenario according to an embodiment of the disclosure.

If a UE supporting a V2X service moves out of coverage of an eNB providing the V2X service, it may declare that it is out of the V2X service coverage (out-of-coverage). If the UE moves out of the V2X service coverage, this may correspond to a scenario in which the UE may transmit/receive the V2X service data without any eNB. If it is determined that the UE is out of the V2X service coverage, the UE cannot receive information on any resource pool for use in transmitting/receiving V2X service data. In order to provide the UE located out of the V2X service coverage with the V2X service, the UE may be preconfigured with resource pool information for use in transmitting/receiving V2X service data. The V2X resource pool information for the use by the UE located out of the V2X service coverage may be configured in a SIM of the UE or downloaded in an OTA manner.

The V2X resource pool information configured to the UE located out of the V2X service coverage may include at least one of information on PLMNs that may provide the V2X service to the UE, information on frequencies on which the V2X service may be provided, information on a transmission/reception resource pool corresponding to the frequencies on which the V2X service may be provided, per-V2X traffic type frequency information, or information on transmission/reception resource pools corresponding to the per-V2X traffic type frequencies. The information on the per-frequency resource pools with which the V2X service can be provided may be common in all PLMNs or dedicated to a specific PLMN. The preconfigured information may include an indicator indicating whether the per-frequency resource configuration is common in all PLMNs.

Figure 15:
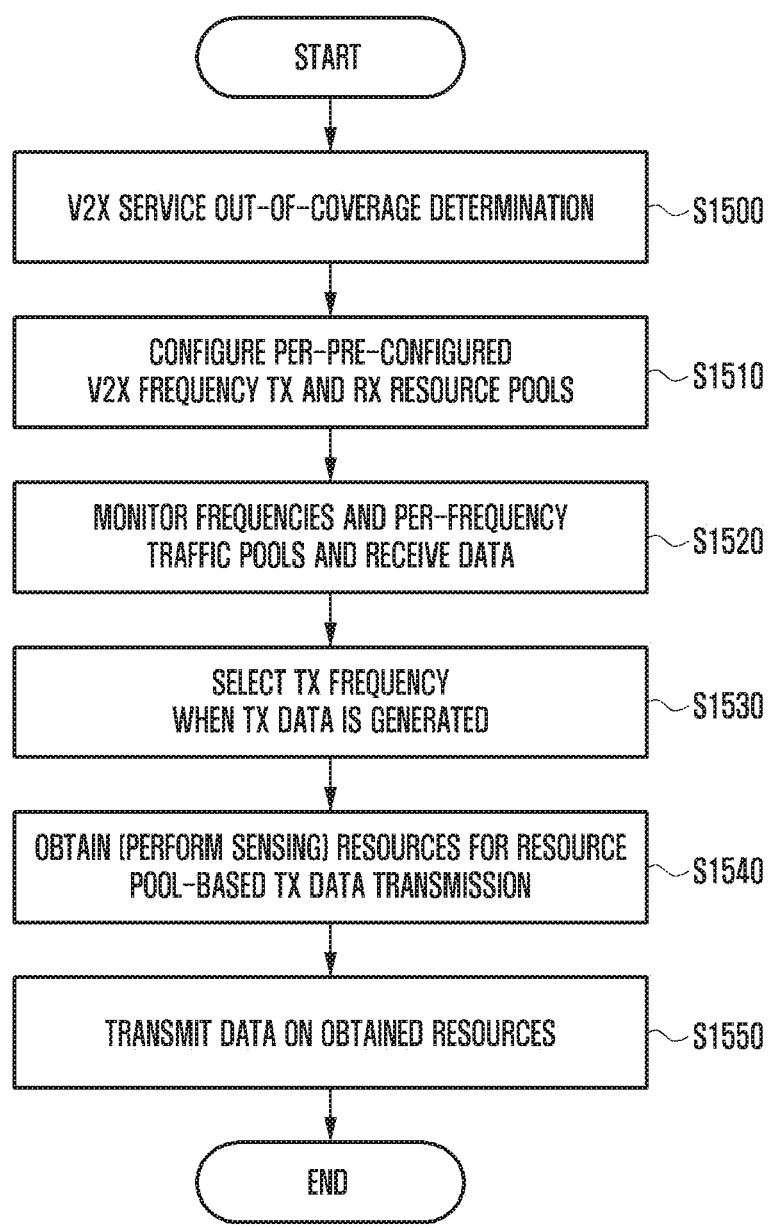
FIG. 15 is a flowchart illustrating a method for an out-of-coverage UE to process V2X frequencies and transmission/reception resource pools.

FIG. 15 is a flowchart illustrating a method for an out-of-coverage UE to process V2X frequencies and transmission/reception resource pools.

A UE supporting a V2X service determines at step S1500 whether it is located out of V2X service coverage. According to an embodiment of the disclosure, if the UE cannot discover a serving cell or if the UE cannot receive an SIB-V2X message from a serving cell to which it has connected or, if there is, although the UE receives the SIB-V2X message from the serving cell to which it has connected, no frequency available for a V2X operation of the UE, the UE may determine that it is located out of the V2X service coverage. At step S1510, the UE is configured with the per out-of-coverage V2X frequency transmission and reception resource pools for transmitting and receiving V2X service data. In an alternative embodiment, the per out-of-coverage V2X frequency transmission and reception resource pools for transmitting and receiving V2X service data may be configured in an OTA manner. The UE may monitor the out-of-coverage service frequencies and per-frequency per-traffic type reception resource pools that are identified at step S1510 to receive V2X data at step S1520. If the out-of-coverage service frequency differs among PLMNs, the UE monitors the frequency of the PLMN with which the UE is registered. If the out-of-coverage service frequency is identical among PLMNs, the UE monitors a frequency to which it can access.

If the UE detects occurrence of V2X data to be transmitted, it may select, at step S1530, an out-of-coverage service frequency identified at step S1510. If per-traffic type frequencies are designated, the UE may select, at step S1530, a frequency and a transmission resource pool corresponding to the type of traffic to be transmitted by the UE. If per-PLMN frequencies are designated, the UE may select, at step S1530, a frequency and a transmission resource pool corresponding to a PLMN with which the UE is registered.

At step S1540, the UE may secure the resources for use in transmitting data on the selected frequency. At step S1540, the resources may be secured in an sensing manner. At step S1550, the UE may transmit V2X data on the secured transmission resources.

Figure 16:
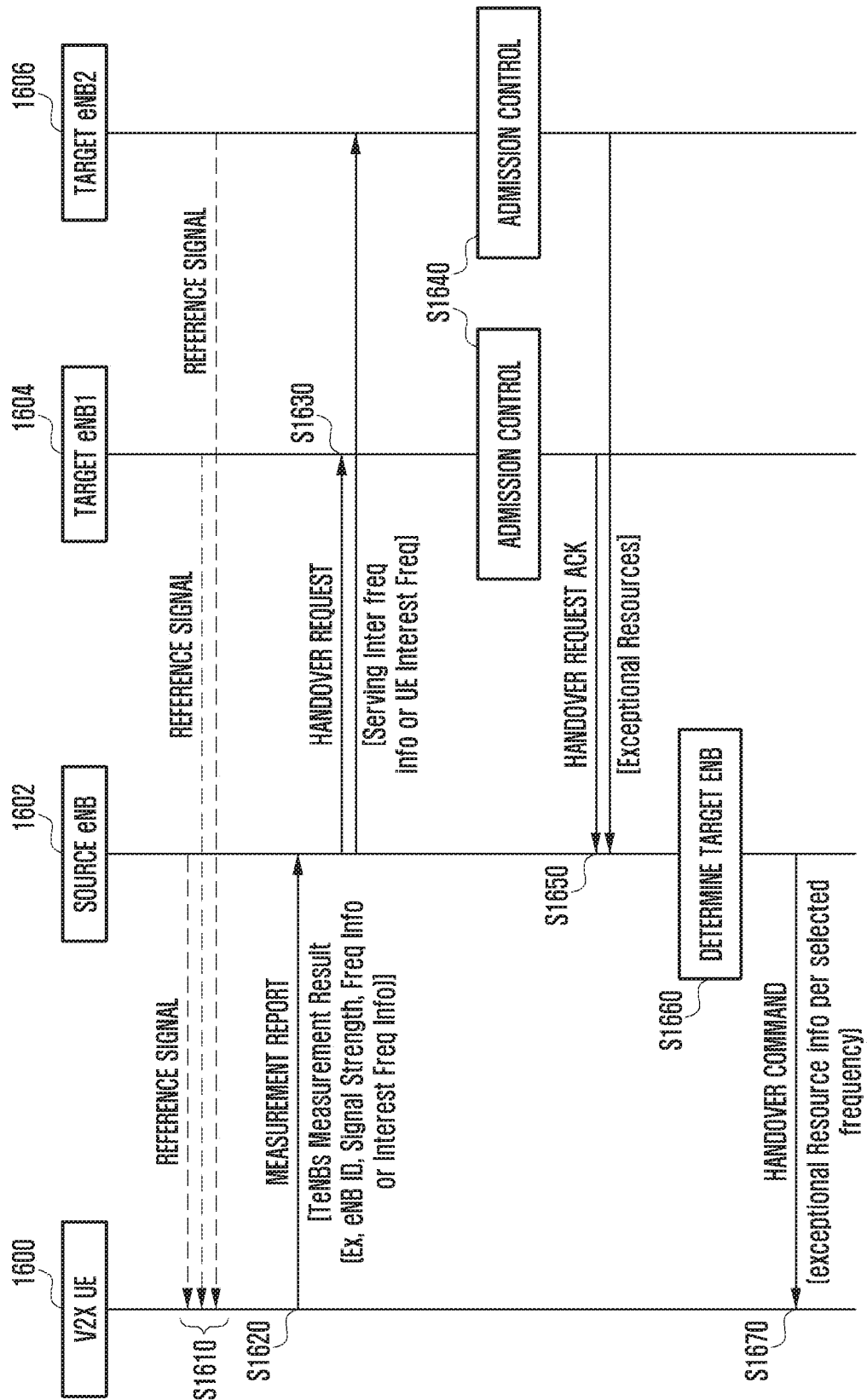
FIGS. 16, 17, and 18 are diagrams illustrating a method for managing multicarrier-based V2X resource pool information, particularly an exceptional pool, during a handover of a UE according to various embodiments of the disclosure.
Figure 17:
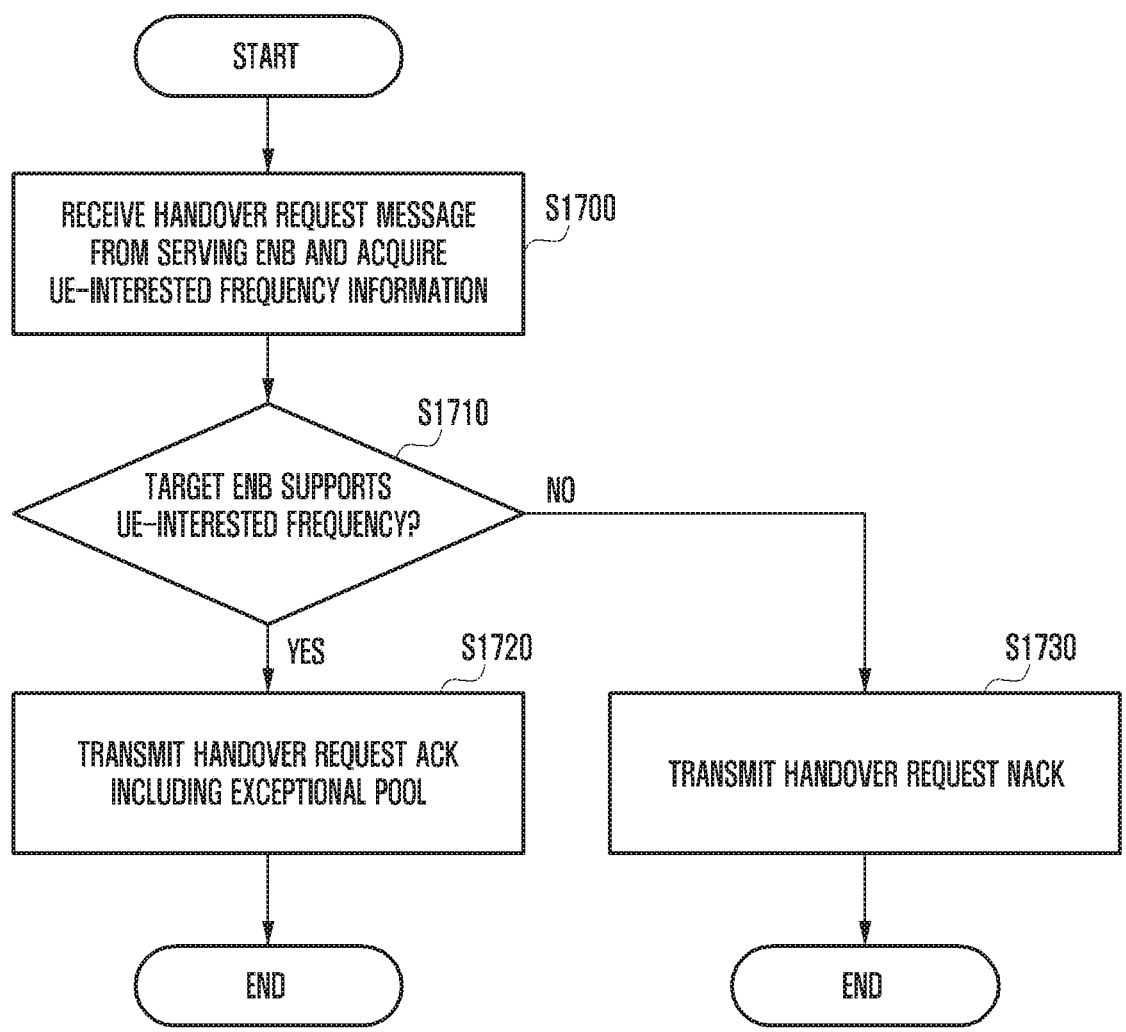
Figure 18:
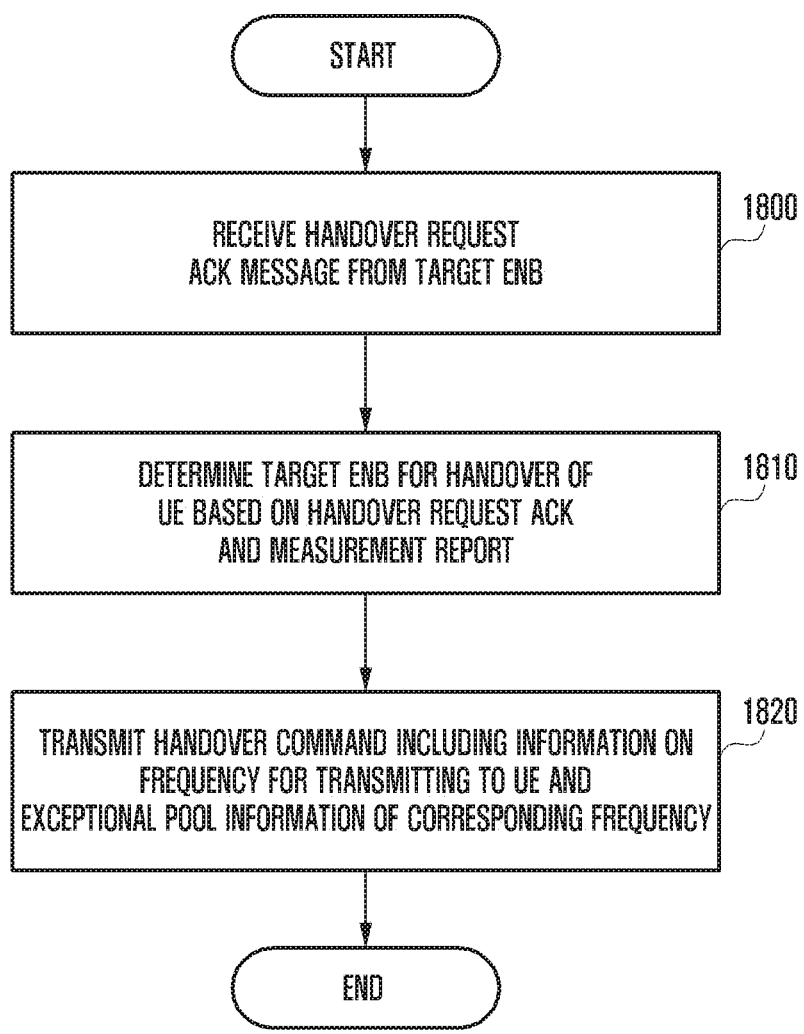

FIGS. 16, 17, and 18 are diagrams illustrating a method for managing multicarrier-based V2X resource pool information, particularly an exceptional pool, during a handover of a UE according to various embodiments of the disclosure.

FIG. 16 is a signal flow diagram illustrating a handover procedure in a system supporting multicarrier communication.

In the system supporting multicarrier communication, an eNB may determine whether a multicarrier communication with a UE is available through the methods described with reference to FIGS. 2 to 11.

According to the embodiment of FIG. 16, in the system supporting multicarrier communication, eNBs 1602, 1604, and 1606 transmit pre-frequency reference signals on their respective frequencies at step S1610. For example, if the target eNB 1604 uses frequency 1 (e.g., 2.45 GHz) and frequency 2 (e.g., 2.47 GHZ), it transmits the reference signals to the UE on frequencies 1 and 2.

The UE may measure received signal strengths of the reference signals transmitted by the eNBs and transmit at step S1620, if the received signal strengths satisfy a predetermined condition, a measurement report message including the per-eNB received signal strengths measured at the UE to the source eNB 1602. The predetermined condition is satisfied if a received signal strength difference between the source eNB and each of the target eNBs is equal to or greater than a predetermined value and, in this case, the UE may determine a measurement report transmission timing. If the received signal strength of the source eNB is weaker than that of a target eNB and the difference between the received signal strengths of the source and target eNBs is equal to or greater than a predetermined threshold value, the UE may perform a measurement report to the source eNB. If any of various handover trigger conditions is satisfied, the UE may perform a measurement report to the source eNB, and descriptions of the various handover trigger conditions are omitted because the handover trigger conditions are out of the scope of the disclosure. The measurement report message may include an ID of the eNB for which the measurement has been performed, information on the frequency on which the measurement has been performed (e.g., frequency index, center frequency information, and frequency information), a measured signal strength (e.g., reference signal received power (RSRP), reference signal received quality (RSRQ), and signal strength), or information on interest frequencies supportable by the UE (e.g., information on safety-related or non-safety-related frequency in use, information on frequencies available for the UE, and interested frequency information).

The information on the interest frequencies supportable by the UE may be included or not according to the operation of the eNB. For example, if the eNB has already acquired the UE capability information and the UE's interest frequency information from a UE capability information (UEcapaInformation) message or a Sidelink UE information message transmitted by the UE, the UE may not include the UE's interest frequency information in the measurement report.

Upon receipt of the measurement report signal from the UE, the source eNB transmits, at step S1630, a handover request message including the UE-interested frequency information (or serving frequency information) to the target eNBs 1604 and 1606 based on the measurement report. The handover request message being transmitted to the target eNBs may include information on frequencies that may be used by the UE, information on frequencies available for simultaneous transmission/reception in a band for V2X PC5, information on a band and band combination available for simultaneous transmission/reception through V2X PC5 and Uu interfaces, information on the frequency of the current Uu interface, information on frequencies on which the current eNB can allocate resources, mapping information of at least one per-frequency service category, or information on a safety-related carrier supported by the source eNB. Examples of the safety-related carrier information may include information on whether the eNB supports a V2X safety service and information on a frequency in use for the safety purpose.

At step S1640, the target eNBs each perform Admission Control based on the UE-interested frequency information included in the handover request message. Each target eNB makes a handover decision based on a result of the Admission Control and transmits a handover request acknowledgement (ACK) message to the source eNB at step S1650. If a specific target eNB is determined to serve the corresponding UE, the corresponding target eNB transmits the handover request ACK message including information on the exception resources for use by the V2X UE in handover. The exceptional resource information may include exceptional resources frequency information and pool information, transmission parameters (MCS, number of retransmissions, retransmission resource locations, etc.) for use with the corresponding pool, sensing configuration information for use with the corresponding pool, and information necessary for performing a CBR report.

The exceptional resource information may be associated with a signal frequency or multiple frequencies. If there is one UE-interested (or UE-preferred) frequency and if the target eNBs can accommodate the same frequency, the frequency for an exceptional pool may be one; if there are multiple UE-interested frequencies and if the target eNBs can accommodate multiple frequencies, the handover ACK message may include information on the exceptional pool for multiple frequencies and frequency information. In the case of being related with multiple frequencies, the handover ACK message should include per-frequency exceptional resource information for all the frequencies and, additionally, an indication for indicating per-frequency service type for transmitting service type data. Examples of the service type may include a safety service and a non-safety service. If the number of the UE-interested transmission or reception frequencies is 1 and if the target eNB can accommodate the interested frequency, the handover request ACK message may include only the exceptional pool information without any frequency information.

If the source eNB receives the handover request ACK messages from the target eNBs, it selects, at step S1660, one of the target eNBs based on the information included in the measurement report and handover request ACK messages and transmits a handover command message to the UE at step S1670. The handover command message includes information on the exceptional resources available for use in handover of the UE. The exceptional resource information may include exceptional resources frequency information and pool information (exceptional resource information per selected frequency), transmission parameters for use with the corresponding pool (MCS, retransmission parameters, etc.), sensing configuration information for use with the corresponding pool, and information necessary for performing a CBR report.

The exceptional resource information may be associated with a signal frequency or multiple frequencies. In the case of being related with multiple frequencies, the handover ACK message should include per-frequency exceptional resource information for all the frequencies and, additionally, an indication for indicating per-frequency service type for transmitting service type data. Examples of the service type may include a safety service and a non-safety service. In the case of being related with a single frequency, if the signal frequency is in use by the current serving eNB, the handover command message may include only the exceptional pool information without any frequency information.

A target eNB may transmit to the source eNB a handover request NACK message, which may include a v2x-non-available indicator indicating NACK for the case where there is no frequency supporting V2X matching the UE-interested frequency for V2X. If the source eNB receives the handover request NACK messages from all of the candidate target eNBs, it determines whether the V2X service is unavailable or failed by Admission Control on the Uu interface based on the information included in the handover request NACK message and, if the legacy Uu interface handover is possible even though the V2X service is unavailable, transmits information on the reserved resources and access information of the corresponding target eNB to the UE via the handover command message. Upon receipt of this information, the UE may transmit/receive V2X service data on preconfigured resources assuming that it is located out of coverage without any separate V2X resource information from the target eNB. The UE may normally perform the Uu interface handover and perform access to the target eNB.

In an alternative embodiment, the exceptional pool indicated in the handover command message may be used only for a safety-related purpose. If the handover command message includes information on the exceptional pool and V2X inter-carrier frequency, the UE may recognize that the given exceptional pool is a pool for the purpose of the V2X safety service based on the frequency and service type mapping information received from the S-eNB or T-eNB. If the UE has use of the resource pool of a safety-related carrier of the S-eNB, the handover command message may include the information on the exceptional pool corresponding to the safety-related carrier of the T-eNB in order for the UE to use the exceptional pool in performing a handover to the T-eNB.

FIG. 17 is a flowchart illustrating a method for a target eNB to perform an Admission Control in a system supporting multicarrier.

The target eNB receives a handover request message from a source eNB at step S1700. The handover request message may include UE-interested frequency information and frequency information for use by the UE, which is determined by the serving eNB based on the UE-interested frequency information and transmitted via a dedicated RRC message. The target eNB checks successively or simultaneously the frequency information for use by the UE that is transmitted via the dedicated RRC message and the UE-interested frequency information to determine whether the target eNB can support the UE capability and preferred frequency and determine whether to make a handover decision.

In detail, the target eNB checks first at step S1700 the handover request message for the frequency information for use by the UE, the information having been transmitted via the dedicated RC message. The frequency information for use by the UE is the frequency information that is supposed to be used by the UE and indicates frequencies each marked with whether they are for a safety traffic purpose or a non-safety traffic purpose, the frequency information having been transmitted via the dedicated RRC message. This information is a subset of UE-interested frequency information and determined and delivered by the eNB.

The target eNB determines at step S1710 whether it can support the frequency for use by the UE in the above information. If the target eNB can support the frequency included in the above information, it transmits at step S1720 a handover request ACK message including information on the corresponding frequency and service purpose to the source eNB.

If the target eNB cannot support the frequency information for use by the UE that has been delivered via the dedicated RRC message, the serving eNB may check the UE-interested frequency information again. In this case, the serving eNB may transmit a UE-interested frequency request signal to the UE. The serving eNB may also identify another target eNB that can support the UE-interested frequency information supportable by the UE. The UE-interested frequency may be the information on the carrier available for use by the UE and may include safety-related or non-safety-related carrier information. The UE-interested frequency information may include information on one or more UE-interested frequencies. For example, if the UE supports only the safety-related carrier, it may transmit to the source eNB the UE-interested frequency information including only the safety-related carrier information, and the source eNB transmits the handover request message including carrier information supportable by the UE, here, safety-related carrier information to the target eNB. In an alternative embodiment, if the UE supports safety-related and non-security-related carriers, it transmits the UE-interested frequency information including safety-related and non-safety-related carrier information to the source eNB, and the source eNB transmits a handover request message including the safety-related and non-safety-related carrier information to the target eNB.

If the target eNB determines that it supports a handover of the UE, the target eNB may transmit, at step S1720, a handover request ACK message including information on a frequency and a pool as exceptional resources for use by the UE in the handover. For example, in the case where the frequency information for use by the UE or the UE-interested frequency information that is carried in the dedicated RRC message transmitted by the source eNB includes information only on the safety-related carriers, the target eNB may transmit a handover request ACK message including exceptional resource information of the safety-related carriers.

In an alternative embodiment, in the case where the frequency information for use by the UE or the UE-interested frequency information that is carried in the dedicated RRC message transmitted by the source eNB includes information on the safety-related and non-safety-related carriers, the target eNB may transmit a handover request ACK message including exceptional resource information of the safety-related frequencies and exceptional resource information of the non-safety-related frequencies.

In an alternative embodiment, in the case where the UE has received a safety service based on serving frequency information indicated in the dedicated RRC message transmitted by the source eNB, the target eNB determines whether it can support the safety service on the corresponding carrier based on the safety-related carrier information transmitted by the source eNB. If it is determined that the target eNB is capable of managing the corresponding carrier, the target eNB may transmit a handover request ACK message including information on a safety-related exceptional resource pool configured on the corresponding carrier to the serving eNB.

If it is determined that the target eNB cannot provide the safety service on the corresponding carrier based on the safety-related carrier information included in the dedicated RRC message transmitted by the source eNB, the target eNB checks the UE-interested frequency information for a frequency supportable by the target eNB. If there is a supportable frequency, the target eNB may configure exceptional resources based on the frequency information supportable by the target eNB. Here, the information on the resource pool for safety/non-safety-related traffic is provided to the UE based on the safety/non-safety carrier information of the target eNB.

If it is determined that the target eNB cannot provide the safety service on the corresponding carrier based on the safety-related carrier information included in the dedicated RRC message transmitted by the source eNB, the target eNB checks the UE-interested frequency information for a frequency supportable by the target eNB and, if failing to find a frequency supportable by the target eNB, transmits a handover request NACK message to the source eNB at step S1730.

The handover request NACK message may include a cause of NACK. For example, if it is determined that the target eNB cannot support a safety-related service through the above operation, the target eNB may transmit a handover request NACK message including information indicating that the safety-related service is not supported. For example, if the target eNB cannot support the UE-interested frequency, the handover request NACK message may include information indicating that the UE-interested frequency is not supported. The handover request NACK message may include information indicating whether the UE can connect to the target eNB through a Uu handover without any V2X service.

The exceptional resource information may include a location of a pool (e.g., frequency and time information), a frequency, sensing configuration information, CBR report information, and mapping between service types and pools.

In the case where the safety and non-safety features are not distinguishable and information on one or more UE-interested frequencies is included, the target eNB may include per-frequency exceptional resource information in the handover request ACK message.

If the frequency and pool information about the exceptional resources is determined through the above operation, the target eNB may transmit a handover request ACK message including the exceptional resource pool information or information on the frequency on which the exceptional resources are located to the source eNB.

FIG. 18 is a flowchart illustrating an operation of a source eNB after receiving a handover request ACK message in a system supporting multicarrier.

At step 1800, the source eNB receives a handover request ACK message including exceptional resource information from a target eNB. At step 1810, the source eNB may determine the target eNB for handover of a UE based on a measurement report transmitted by the UE and information included in the handover ACK message.

For example, in the case where there are two candidate target eNBs, i.e., target eNB 1 and target eNB 2, capable of supporting a UE-interested frequency, the source eNB receives handover request ACK messages from target eNB 1 and target eNB 2 and selects one of the two candidate target eNBs as the target eNB for handover of the UE. In this case, the source eNB checks signal strengths on the frequencies of the candidate target eNBs that are included in the measurement report transmitted by the UE to select the eNB with a better signal strength as the target eNB for handover of the UE.

After determining the target eNB for handover of the UE, the source eNB transmits a handover command message to the UE at step 1820. The handover command message includes target eNB information and information on exceptional resources for use before being attached to the target eNB. This information may include information on one or more frequencies available for use by the UE, information on exceptional pools corresponding to respective frequencies, sensing information per pool, CBR report information, zone configuration information, and per-pool transmission parameters. In the case where multi-frequency information is transmitted to the UE, per-frequency service types are explicitly indicated, and the UE selects a safety-related frequency or a non-safety-related frequency and transmits data on the resources of the exceptional pool corresponding to the selected frequency.

If exceptional resource information is received, the UE may transmit a message for the purpose of V2X using the corresponding resources until a cell is changed. For example, if the exceptional resource information explicitly indicates the safety purpose of V2X, the corresponding resources are used for a safety purpose; if the exceptional resource information does not explicitly indicate the safety purpose (e.g., if there is only resource information without any frequency information), the corresponding resources may be used only for transmitting safety-related messages.

In an alternative embodiment, if the frequency information of the exceptional pool for use in handover of the UE to the target eNB is identical with the frequency information used at the source eNB, the handover command message may include only the exceptional pool information with the exception of the frequency information.

In an alternative embodiment, the source eNB may transmit to the UE an indicator indicating whether the exceptional pool information for use by the target eNB is identical with the exceptional pool information in use by the source eNB.

In an alternative embodiment, the exceptional pool indicated in the handover command message may be used only for a safety service purpose. If it is necessary to transmit a non-safety service purpose V2X message in the course of the handover of the UE to the target eNB, it may be possible acquire the pool information transmitted by the target eNB for transmitting the non-safety service V2X message.

Figure 19:
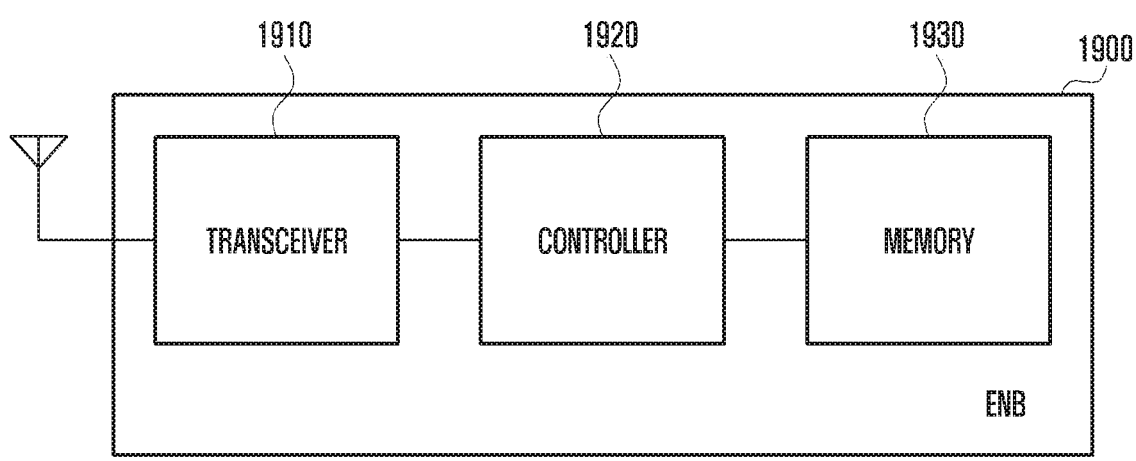
FIG. 19 is a block diagram illustrating a configuration of an eNB according to an embodiment of the disclosure.

FIG. 19 is a block diagram illustrating a configuration of an eNB according to an embodiment of the disclosure.

In reference to FIG. 19, the eNB 1900 may include a transceiver 1910, a controller 1920, and a memory 1930. In the disclosure, the controller may be defined as a circuit, an application-specific integrated circuit, or at least one processor.

The transceiver may transmit and receive a signal to and from a UE receiving a V2X service. In detail, the transceiver 1910 may transmit V2X-related system information and a dedicated RRC message to the UE by way of example. The controller 1920 may control overall operations of the eNB according to an embodiment of the disclosure. For example, the controller 1920 may control signal flows among function blocks to execute the operations described with reference to FIGS. 2 to 18. In detail, the controller 1920 may control to transmit the V2X-related system information, receive multiple interest frequency information from the UE, determine pool information based on the information received from the UE, and transmit the pool information to the UE. The memory 1930 may store at least one of information transmitted/received by the transceiver 1910 and information generated by the controller 1920. For example, the memory 1930 may store V2X carrier information and reception/transmission pool information corresponding to carriers.

Figure 20:
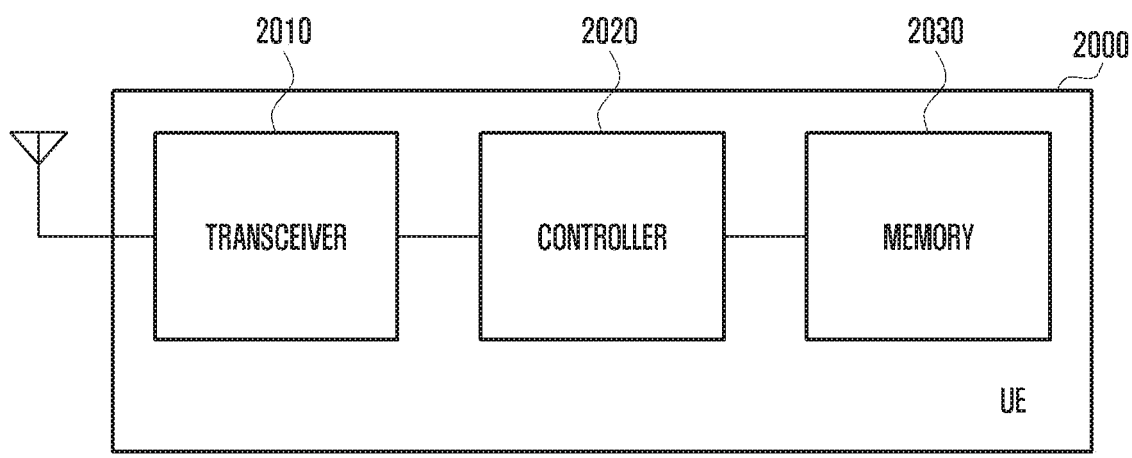
FIG. 20 is a block diagram illustrating a configuration of a UE according to an embodiment of the disclosure.

FIG. 20 is a block diagram illustrating a configuration of a UE according to an embodiment of the disclosure.

In reference to FIG. 20, the UE 2000 may include a transceiver 2010, a controller 2020, and a memory 2030. In the disclosure, the controller may be defined as a circuit, an application-specific integrated circuit, or at least one processor.

The transceiver 2010 may transmit and receive signals to and from an eNB supporting a V2X service. In detail, the transceiver 2010 may receive V2X-related system information and a dedicated RRC message from the eNB by way of example. The controller 2020 may control overall operations of the eNB according to an embodiment of the disclosure. For example, the controller 2020 may control signal flows among function blocks to execute the operations described with reference to FIGS. 2 to 18. In detail, the controller 2020 may control to transmit the V2X-related system information, transmit multiple interest frequency information to the eNB, sense pool resources based on pool information received from the eNB, and transmit a sensing result to the UE based on the pool information. The memory 2030 may store at least one of information being transmitted/received by the transceiver 2010 and information generated by the controller 2020. For example, the memory 2030 may store V2X carrier information and reception/transmission pool information corresponding to carriers.

The invention claimed is:

1. A method performed by a user equipment (UE) in a communication system, the method comprising:
receiving, from a base station, system information including information on an inter vehicle-to-everything (V2X) frequency, the information on the inter V2X frequency including a public land mobile network (PLMN) for the inter V2X frequency, a V2X carrier frequency and information on transmission and reception resource pools corresponding to the inter V2X frequency;
transmitting, to the base station, UE capability information; and
transmitting, to the base station, sidelink UE information including information on interested V2X frequencies on which the UE is to receive or transmit a V2X communication,
wherein the UE capability information includes first band combination information indicating one or more V2X bands that are available for simultaneous transmission with an Uu interface and the V2X communication for a specific band of the Uu interface, and second band combination information indicating one or more V2X bands that are available for simultaneous reception with the Uu interface and the V2X communication for a specific band of the Uu interface, and
wherein the first band combination information and the second band combination information are indicated by bitmaps associated with entries of one or more V2X bands, respectively.

2. The method of claim 1, wherein the information on transmission and reception resource pools includes a zone configuration, time and frequency resource of the transmission and reception resource pools and channel busy ratio (CBR) measurement configuration on the transmission and reception resource pools.

3. The method of claim 1, wherein the information on the interested V2X frequencies includes information indicating frequency indices based on the system information.

4. The method of claim 1, further comprising:
receiving, from the base station, dedicated RRC signaling including dedicated configuration information on an inter V2X frequency for the V2X communication,
wherein the dedicated configuration information on the inter V2X frequency includes a V2X carrier frequency and information on transmission and reception resource pools corresponding to the inter V2X frequency.

5. The method of claim 1, further comprising:
identifying preconfigured resource pool configuration information, in case that the UE is out-of-coverage,
wherein the preconfigured resource pool configuration information includes transmission and reception resource pool configuration corresponding to a frequency for out-of-coverage.

6. A method performed by a base station in a communication system, the method comprising:
transmitting, to a user equipment (UE), system information including information on an inter vehicle-to-everything (V2X) frequency, the information on the inter V2X frequency including a public land mobile network (PLMN) for the inter V2X frequency, a V2X carrier frequency and information on transmission and reception resource pools corresponding to the inter V2X frequency; and
receiving, from the UE, UE capability information; and
receiving, from the UE, sidelink UE information including information on interested V2X frequencies on which the UE is to receive or transmit a V2X communication,
wherein the UE capability information includes first band combination information indicating one or more V2X bands that are available for simultaneous transmission with an Uu interface and the V2X communication for a specific band of the Uu interface, and second band combination information indicating one or more V2X bands that are available for simultaneous reception with the Uu interface and the V2X communication for a specific band of the Uu interface, and
wherein the first band combination information and the second band combination information are indicated by bitmaps associated with entries of one or more V2X bands, respectively.

7. The method of claim 6, wherein the information on transmission and reception resource pools includes a zone configuration, time and frequency resource of the transmission and reception resource pools and channel busy ratio (CBR) measurement configuration on the transmission and reception resource pools.

8. The method of claim 6, wherein information on the interested V2X frequencies includes information indicating frequency indices based on the system information.

9. The method of claim 6, further comprising:
transmitting, to the UE, dedicated RRC signaling including dedicated configuration information on an inter V2X frequency for the V2X communication,
wherein the dedicated configuration information on the inter V2X frequency includes a V2X carrier frequency and information on transmission and reception resource pools corresponding to the inter V2X frequency.

10. A user equipment (UE) in a communication system, the UE comprising:
a transceiver; and
a controller coupled with the transceiver and configured to:
receive, from a base station, system information including information on an inter vehicle-to-everything (V2X) frequency, the information on the inter V2X frequency including a public land mobile network (PLMN) for the inter V2X frequency, a V2X carrier frequency and information on transmission and reception resource pools corresponding to the inter V2X frequency,
transmit, to the base station, UE capability information, and
transmit, to the base station, sidelink UE information including information on interested V2X frequencies on which the UE is to receive or transmit a V2X communication,
wherein the UE capability information includes first band combination information indicating one or more V2X bands that are available for simultaneous transmission with an Uu interface and the V2X communication for a specific band of the Uu interface, and second band combination information indicating one or more V2X bands that are available for simultaneous reception with the Uu interface and the V2X communication for a specific band of the Uu interface, and
wherein the first band combination information and the second band combination information are indicated by bitmaps associated with entries of one or more V2X bands, respectively.

11. The UE of claim 10, wherein the information on transmission and reception resource pools includes a zone configuration, time and frequency resource of the transmission and reception resource pools and channel busy ratio (CBR) measurement configuration on the transmission and reception resource pools.

12. The UE of claim 10, wherein information on interested V2X frequencies includes information indicating frequency indices based on the system information.

13. The UE of claim 10,
wherein the controller is further configured to receive, from the base station, dedicated RRC signaling including dedicated configuration information on an inter V2X frequency for the V2X communication, and
wherein the dedicated configuration information on the inter V2X frequency includes a V2X carrier frequency and information on transmission and reception resource pools corresponding to the inter V2X frequency.

14. The UE of claim 10,
wherein the controller is further configured to identify preconfigured resource pool configuration information, in case that the UE is out-of-coverage, and
wherein the preconfigured resource pool configuration information includes transmission and reception resource pool configuration corresponding to a frequency for out-of-coverage.

15. A base station of a communication system, the base station comprising:
a transceiver; and
a controller coupled with the transceiver and configured to:
transmit, to a user equipment (UE), system information including information on an inter vehicle-to-everything (V2X) frequency, the information on the inter V2X frequency including a public land mobile network (PLMN) for the inter V2X frequency, a V2X carrier frequency and information on transmission and reception resource pools corresponding to the inter V2X frequency,
receive, from the UE, UE capability information, and
receive, from the UE, sidelink UE information including information on interested V2X frequencies on which the UE is to receive or transmit a V2X communication,
wherein the UE capability information includes first band combination information indicating one or more V2X bands that are available for simultaneous transmission with an Uu interface and the V2X communication for a specific band of the Uu interface, and second band combination information indicating one or more V2X bands that are available for simultaneous reception with the Uu interface and the V2X communication for a specific band of the Uu interface, and
wherein the first band combination information and the second band combination information are indicated by bitmaps associated with entries of one or more V2X bands, respectively.

16. The base station of claim 15, wherein the information on transmission and reception resource pools includes a zone configuration, time and frequency resource of the transmission and reception resource pools and channel busy ratio (CBR) measurement configuration on the transmission and reception resource pools.

17. The base station of claim 15, wherein information on interested V2X frequencies includes information indicating frequency indices based on the system information.

18. The base station of claim 15,
wherein the controller is further configured to transmit, to the UE, dedicated RRC signaling including dedicated configuration information on an inter V2X frequency for the V2X communication, and
wherein the dedicated configuration information on the inter V2X frequency includes a V2X carrier frequency and information on transmission and reception resource pools corresponding to the inter V2X frequency.

* * * * *